US010608722B2

(12) United States Patent
Yuan

(10) Patent No.: US 10,608,722 B2
(45) Date of Patent: Mar. 31, 2020

(54) COMMUNICATION DEVICE AND A METHOD FOR DETERMINING AN INFORMATION FROM ANOTHER APPARATUS

(71) Applicant: Intel Corporation, Santa Clara, CA (US)

(72) Inventor: Fang Yuan, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/080,027

(22) PCT Filed: Apr. 1, 2016

(86) PCT No.: PCT/CN2016/078334

§ 371 (c)(1),
(2) Date: Aug. 27, 2018

(87) PCT Pub. No.: WO2017/166295

PCT Pub. Date: Oct. 5, 2017

(65) Prior Publication Data

US 2019/0020393 A1 Jan. 17, 2019

(51) Int. Cl.
*H04B 7/06* (2006.01)
*H04B 7/0456* (2017.01)

(52) U.S. Cl.
CPC ......... *H04B 7/0617* (2013.01); *H04B 7/0473* (2013.01)

(58) Field of Classification Search
CPC .. H04B 7/0617; H04B 7/0473; H04B 7/0417; H04B 7/0669; H04L 1/0618; H04L 1/06; H04L 25/0204
See application file for complete search history.

(56) References Cited

U.S. PATENT DOCUMENTS

2006/0292990 A1* 12/2006 Karabinis ............ H01Q 3/2611 455/63.4
2010/0120415 A1 5/2010 Urquhart et al.
2013/0272438 A1 10/2013 Zhu et al.

FOREIGN PATENT DOCUMENTS

CN 1533194 A 9/2004
CN 103262436 A 8/2013
(Continued)

OTHER PUBLICATIONS

Lee et al., Device and method for realizing intelligent antenna technology of frequency division duplex radio duplex radio communication system, Sep. 29, 2004 (English Translation of CN1533194A) (Year: 2004).*

(Continued)

*Primary Examiner* — Ted M Wang

(57) ABSTRACT

A communication device and a method for determining an information from a second device consisting of setting an initial beamforming pattern, wherein the initial beamforming pattern comprises a beamforming direction and a corresponding beamforming area for each of the plurality of antenna ports, comprising determining a concerned direction interval based on overlapping beamforming areas of adjacent pairs of the plurality of antenna ports; receiving a signal from the second device; measuring a signal gain from the signal on each of the plurality of antenna ports; determining which concerned direction interval the second device occupies based on an antenna port having the highest signal gain and on one of the adjacent pair of antenna ports to the antenna port having the highest signal gain having a higher signal gain; and determining the information from the second device based on the determined concerned direction interval.

18 Claims, 11 Drawing Sheets

(56) References Cited

FOREIGN PATENT DOCUMENTS

| | | | |
|---|---|---|---|
| CN | 2016/078334 | A1 | 12/2016 |
| EP | 2938008 | A1 | 10/2015 |

OTHER PUBLICATIONS

Rutger.edu, Transmitting and Receiving Antennas, ecewebl.rutgers.edu, Mar. 16, 2011 (Year: 2011).*

International Search Report based on application No. PCT/CN2016/078334 (11 pages) dated Dec. 29, 2016 (Reference Purpose Only).

Han et al.,"Reference Signals Design for Hybrid Analog and Digital Beamforming", IEEE Communications Letters, vol. 18, No. 7, Jul. 2014.

Wang et al."Beam Codebook Based Beamforming Protocol for Multi-Gbps Millimeter-Wave WPAN Systems", IEEE Journal on Selected Areas in Communications, vol. 27, No. 8, Oct. 2009.

* cited by examiner 200
210
220
250
252
μ
254
θn
230
232
256a
256b

400

500

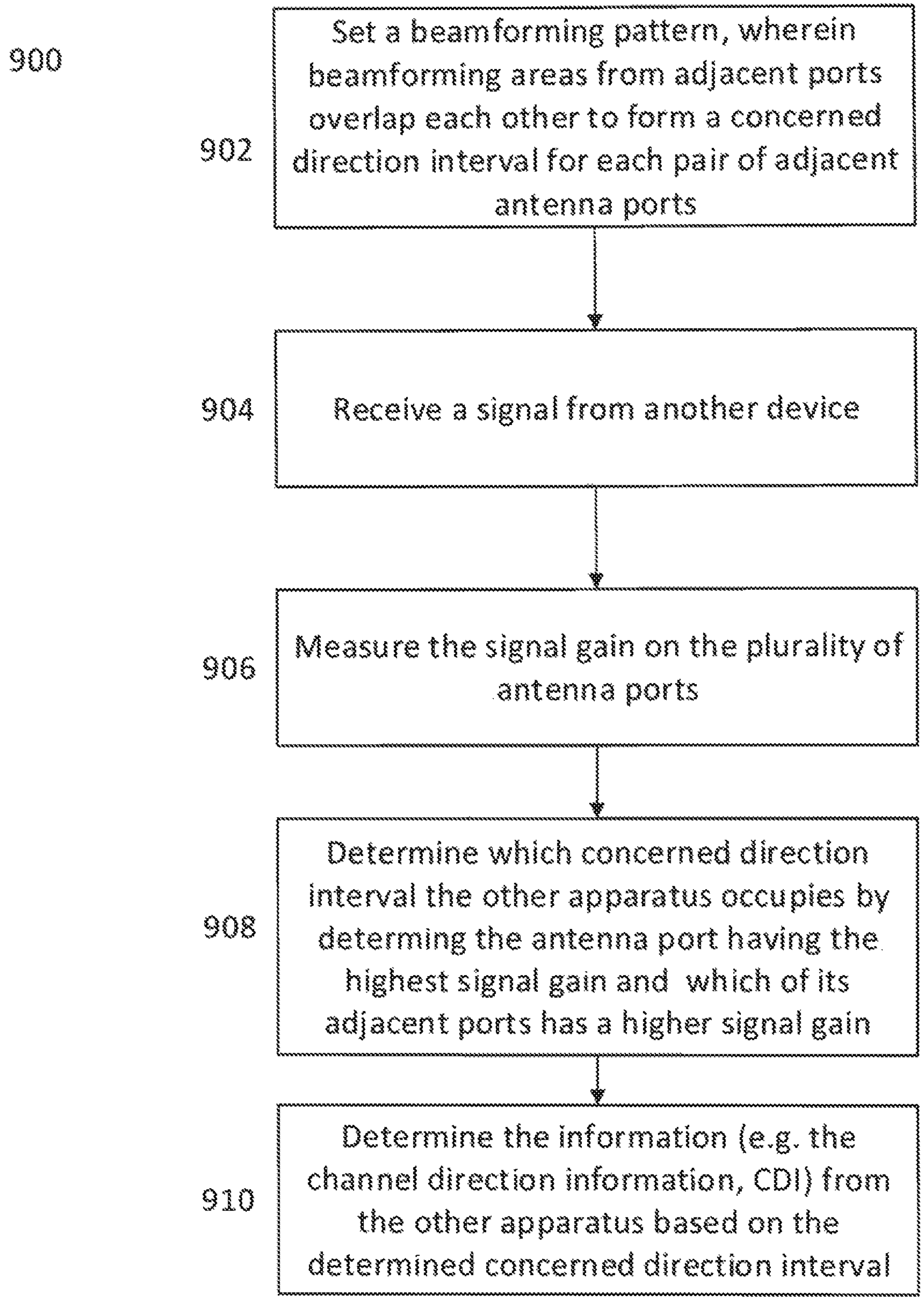
FIG. 9
900
902
Set a beamforming pattern, wherein beamforming areas from adjacent ports overlap each other to form a concerned direction interval for each pair of adjacent antenna ports
904
Receive a signal from another device
906
Measure the signal gain on the plurality of antenna ports
908
Determine which concerned direction interval the other apparatus occupies by determing the antenna port having the highest signal gain and which of its adjacent ports has a higher signal gain
910
Determine the information (e.g. the channel direction information, CDI) from the other apparatus based on the determined concerned direction interval

COMMUNICATION DEVICE AND A METHOD FOR DETERMINING AN INFORMATION FROM ANOTHER APPARATUS

CROSS-REFERENCE TO RELATED APPLICATIONS

This application is a national stage entry according to 35 U.S.C. § 371 of PCT Application No. PCT/CN2016/078334 filed on Apr. 1, 2016, which is incorporated herein by reference in its entirety.

TECHNICAL FIELD

Various aspects of this disclosure relate generally to a method and a device for wireless communications.

BACKGROUND

To meet the increasing data demand in wireless communications, the Long Term Evolution (LTE) standard has proposed to increase the number of antennas at its base stations, i.e. Evolved Node B (abbreviated as eNodeB or enB), to better utilize available resources and increase effective cell capacity. Large-scale multiple-input and multiple-output (or massive MIMO) systems have been employed to increase the number of antennas at both the transmitter and receiver ends of the wireless communication system in order to boost the number of possible signal paths and enhance performance. While conventional mobile communication protocols, such as Long Term Evolution (LTE) standards as specified by the Third Generation Partnership Project (3GPP), may utilize, for example, 2, 4, or 8 layer MIMO systems to supports wireless communications, massive MIMO architectures may expand well past these numbers in order to increase spatial antenna diversity and maximize beamforming gain.

An important factor in improving resource management at the base station, e.g. eNB, is the ability to consistently determine the location of the user equipment (UE).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows a flowchart in an aspect of this disclosure.

DESCRIPTION

Figure 1:
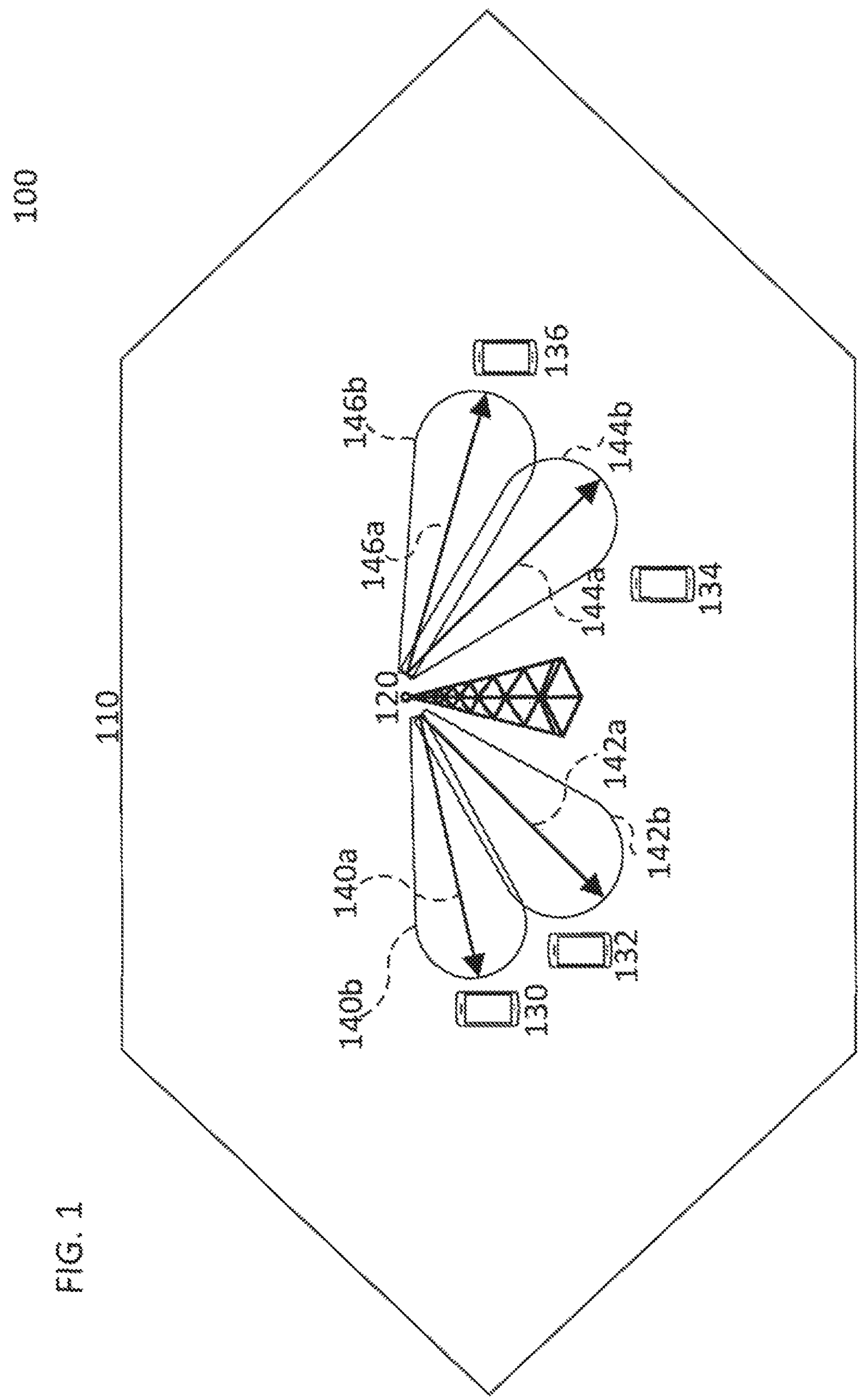
FIG. 1 shows an exemplary communication network in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

FIG. 1 shows a communication network 100 in an aspect of this disclosure. It is appreciated that communication network 100 is exemplary in nature and thus may be simplified for purposes of this explanation.

Communication network 100 may include at least a base station 120 with a corresponding cover region, or cell, 110. Base station 120 may be an eNB with the capability of hybrid beamforming. Communication network 100 may also contain UEs 130-136. Base station 120 may produce beamforming directions 140*a*-146*a* with corresponding beamforming areas 140*b*-146*b*, which together, make up a beamforming pattern from the base station.

An important factor in improving resource management at the base station, e.g. eNB, is the ability to consistently determine the location of the user equipment (UE). In order to acquire accurate UE position information, base stations must accurately acquire the UE's channel direction information (CDI, or $\mu$).

Beamforming is a technique used in wireless communications for directional signal transmission and/or reception. It combines elements in a phased array in a way to constructively interfere with signals at certain angles while other angles experience destructive interference. In this manner, beamforming may concentrate a signal to a target location, e.g. the UE's location. The improvement compared with omnidirectional reception/transmission is known as the gain (or loss in the case of diminishment). Hybrid beamforming consists of a digital unit with antenna ports processing digital signals and an analog beamforming unit with antenna elements processing analog signals. Each antenna port is connected to a subarray of several antenna elements and receives a digital signal filtered by the analog beamforming.

The desirable beamforming direction is towards the channel direction, or location, of the UE, so that the received digital signal strength at the antenna port can be maximized. Accordingly, acquiring the channel direction information, CDI, from the UE at the base station, e.g. eNB, is fundamental to improve the receiving signal quality and data rate in wireless transmissions.

The channel direction information, CDI, acquisition process may be problematic, which can be attributed to the fact that the individual analog signals on each antenna element are not visible to the antenna ports and only the filtered digital signals can be used to acquire the CDI and determine the best analog beamforming direction. In previous solutions, the analog beamforming directions are restricted to a finite set. The base station attempts each beamforming direction in the set and selects the best result as the acquired channel direction information, CDI. The main drawback of this solution is that the acquired channel direction is finite, discrete, and therefore inaccurate to the true channel direction information, CDI. This degrades the performance of analog beamforming in a massive MIMO system.

Communications Network 100 may be configured in accordance with the network architecture of any one of, or any combination of, 5G, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc.

Base station 120 may be associated with a radio access section of communication network 100, i.e. the Radio Access Network (RAN) of communication network 100. Base station 120 may thus act as an interface between the RAN of communication network 100 and an underlying core network of communication network 100 and may allow any proximate UEs, such as, for example, UEs 130-136 to exchange data with the core network of communication network 100.

Base station 120 may provide mobile communication coverage to coverage region 110. As shown in FIG. 1, mobile terminals 130-136 may be physically located within coverage region 110 of base station 120. It is appreciated that although coverage region 110 is depicted as having distinct boundaries, it is understood that coverage region 110 may overlap with another coverage region (not pictured), and accordingly there may exist geographical regions served by two or more of base stations. As depicted in FIG. 1, mobile terminals 130-136 are physically located within coverage region 110. In this manner, mobile terminals 130-136 may access the RAN of mobile communication network 100 via the base station 120.

Base station 120 may have a plurality of antennas capable of operating in a massive multiple input multiple output (massive MIMO) system. Furthermore, base station 120 may have both digital and analog components in order to employ hybrid beamforming.

Base station 120 may emit hybrid beamforming directions 140*a*-146*a* covering areas 140*b*-146*b* which collectively form an overall beamforming pattern. Base station 120 initializes a beamforming direction $\theta_n$, e.g. one of 140*a*-146*a*, and its corresponding beamforming area on each of its plurality of antenna ports (n=1, 2, . . . , N). As shown in FIG. 1, each beamforming area 140*b*-146*b* is a main beam (or main lobe). Although not shown in FIG. 1, it is appreciated that each beamforming area 140*b*-146*b* may also have sidelobes.

As can be seen from communication network 100, the UEs 130-136 are positioned throughout the coverage region 110 of the base station 120 and thus may be located in various areas of the beamforming pattern produced by the base station 120. For example, UE 130 and 136 may be positioned substantially in beamforming directions 140*a* and 146*a*, respectively, and thus very strong signal gains may be achieved from each of the corresponding antenna ports. UE 132 may be positioned in between beamforming directions 140*a* and 142*a*, and thus may still report a strong signal gain, albeit not as strong as those exhibited by 130 and 136. In this example, UE 134 may be located in the weakest area of the beamforming pattern as shown in communication network 100, and thus may report the smallest signal gains. However, the beamforming pattern in this disclosure is designed in a manner in order to maximize coverage and therefore maximize the signal gains in communication network 100. The strategy and employment of the beamforming pattern will be discussed in more detail in the proceeding figures and corresponding explanation.

Figure 2:
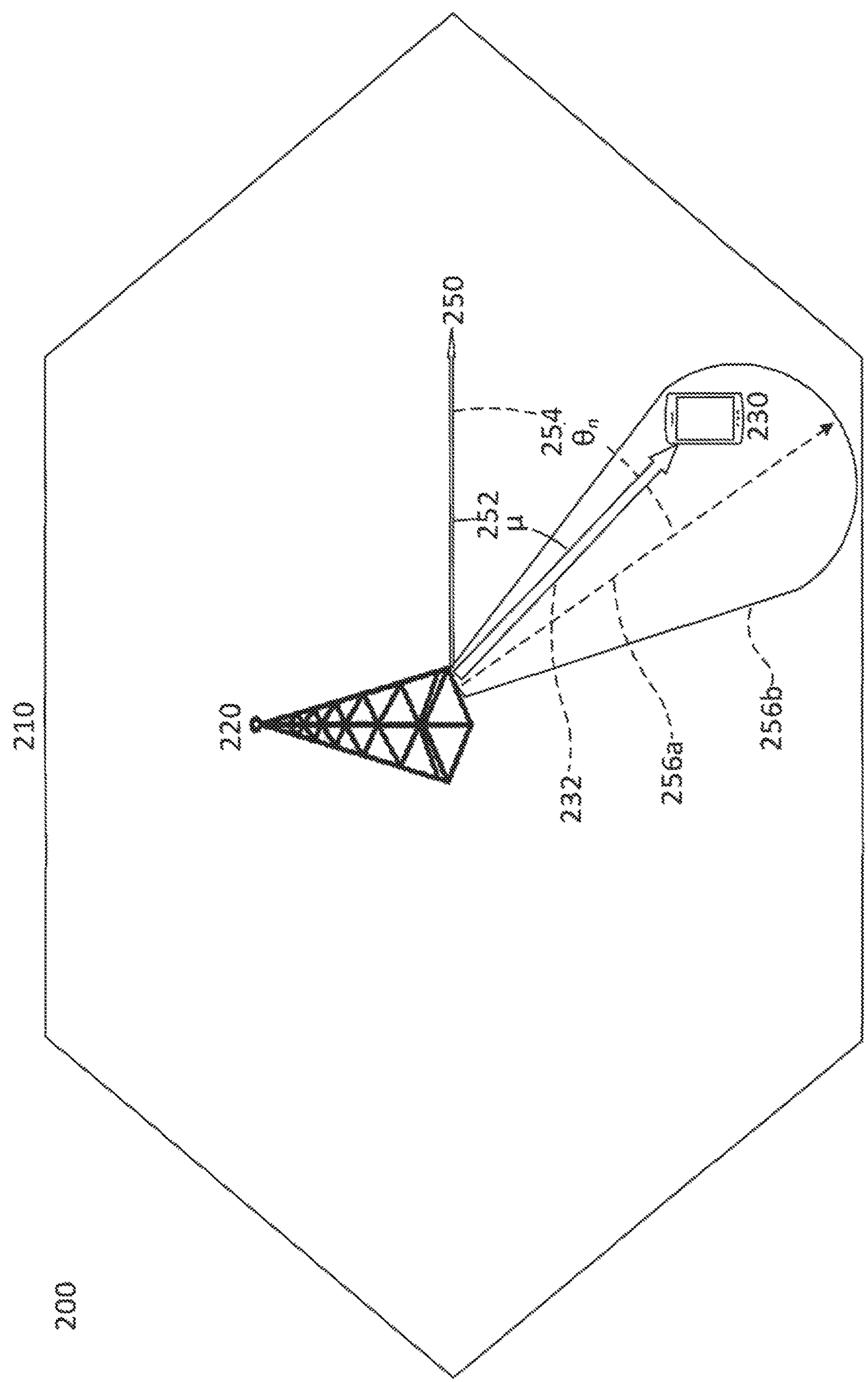
FIG. 2 shows an exemplary communication network scenario in an aspect of this disclosure.

FIG. 2 shows an exemplary communication network scenario 200 in an aspect of this disclosure. In this scenario, a single beamforming direction and its corresponding beamforming area of the overall beamforming pattern will be discussed. It should be appreciated that communication network scenario 200 is exemplary in nature and thus may be simplified for purposes of this explanation.

Base station (e.g. eNB) 220 provides coverage to cell 210 and serves UEs in the coverage area by hybrid beamforming. In the structure of hybrid beamforming, there are N antenna ports (n=1, 2, . . . , N) at the base station and each antenna port is connected to a subarray of M antenna elements (m=1, 2, . . . , M). Each antenna element has a phase shifter controlled by the analog beamforming weight. In this respect, each antenna port is connected to a phased array of antenna elements in which the relative phases of the respective signals feeding the antenna elements are set in such a way that each antenna port's effective beamforming radiation pattern is reinforced in a desired direction and suppressed in undesired directions.

Broadside 250 is the line from which locations (i.e. angles) in relation to the base station are measured from. Accordingly, UE's 230 relative location to the base station 220 is the channel direction information, or $\mu$, 252. The arrow 232 pointing to UE 230 is known as the line of sight (LoS), or the direct line between the base station 220 and the UE 230.

Beamforming direction 256*a* (and corresponding beamforming area 256*b*) of base station antenna port n (not pictured) are at angle $\theta_n$254. It is appreciated that beamforming direction 256*a* is just one or a plurality of beamforming directions (and beamforming areas, e.g. 256*b*) which help to form the overall beamforming pattern from base station 220. It is also appreciated that the main beam (or main lobe) of beamforming area 256*b* is depicted in FIG. 2, but beamforming area 256*b* may also comprise sidelobes.

The analog beamforming associated with the nth antenna port in FIG. 2, is built from a discrete Fourier transform (DFT) beamformer in a form of:

$$w_n=[1,e^{-i\theta_n}, \ldots ,e^{-i(M-1)\theta_n}]^T$$

where $w_n$ represents the beamforming weights and $[\ldots]^T$ represents the matrix transpose. The line of sight (LoS) channel from UE to base station, e.g. eNB, is $$h(\mu)=\sqrt{g}[1,e^{-i\mu}, \ldots ,e^{-i(M-1)\mu}]^T$$

where g is the channel gain and μ is the channel direction information (CDI) related to the location angle of UE with respect to the broadside of the antenna array at base station. When UE 230 send a signal s in uplink, e.g. a sounding reference signal (SRS), the base station 220, e.g. eNB, receives a digital signal on the nth antenna port with a strength $G_n=\|w_n^H h(\mu)s\|^2$, where $[\ \ldots\ ]^H$ represents the conjugate and transpose. The best analog beamforming direction maximizing the signal strength is when $\theta_n=\mu$, i.e. the best analog beamforming direction is towards the channel direction of UE. However, μ is unknown to the base station prior to the CDI acquisition.

Figure 3:
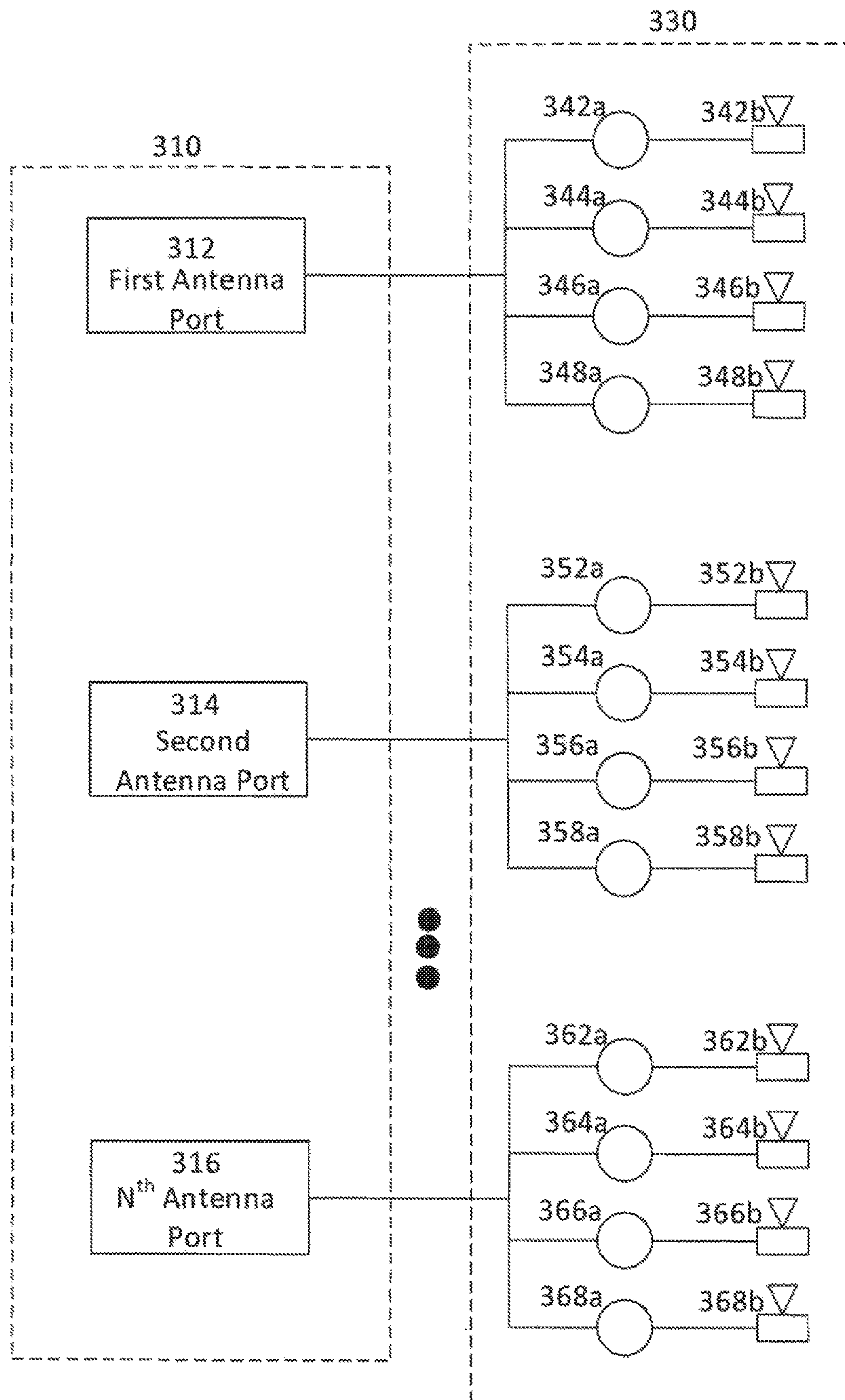
FIG. 3 shows an exemplary system model at a base station for hybrid beamforming in an aspect of this disclosure.

FIG. 3 shows an exemplary hybrid beamforming system model 300 at a base station, e.g. eNB, in an aspect of this disclosure. It is appreciated that system model 300 is exemplary in nature and may thus be simplified for purposes of this explanation.

The digital domain 310 of the base station consists of a plurality of antenna ports, 312-316. In this example, the first two antenna ports 312 and 314 and the last (or $N^{th}$) antenna port 316 are shown. Each antenna port is connected to an array of antenna elements which operate in the analog domain 330. For example, the first antenna port 312 is connected to an array of antenna elements, a first antenna element 342*b* through an $M^{th}$ antenna element 348*b*(as illustrated in FIG. 3, M=4). In system model 300, there are four antenna elements shown for each antenna port, but there may be any number of antenna elements associated with each antenna port. Each antenna element 342*b*-348*b* connected to the first antenna port 312 has a phase shifter 342*a*-348*a*, respectively, controlled by an analog beamforming weight. Likewise, each antenna element 352*b*-358*b* connected to second antenna port 314 has phase shifters 352*a*-358*a*, respectively, and each antenna element 362*b*-368*b* connected to the Nth antenna port 316 has phase shifters 362*a*-368*a*, respectively. By applying a phase shift to the signals transmitted by the antenna elements, the direction at which constructive interference may be altered so as to direct the main beam towards any direction. The amplitudes and phases of the signals may be adjusted by applying suitable antenna weights. Also, for each antenna port/antenna element array system with M antenna elements, the direction of the main beam from each antenna port/antenna element array can be adjusted with up to M−2 sidelobes.

Figure 4:
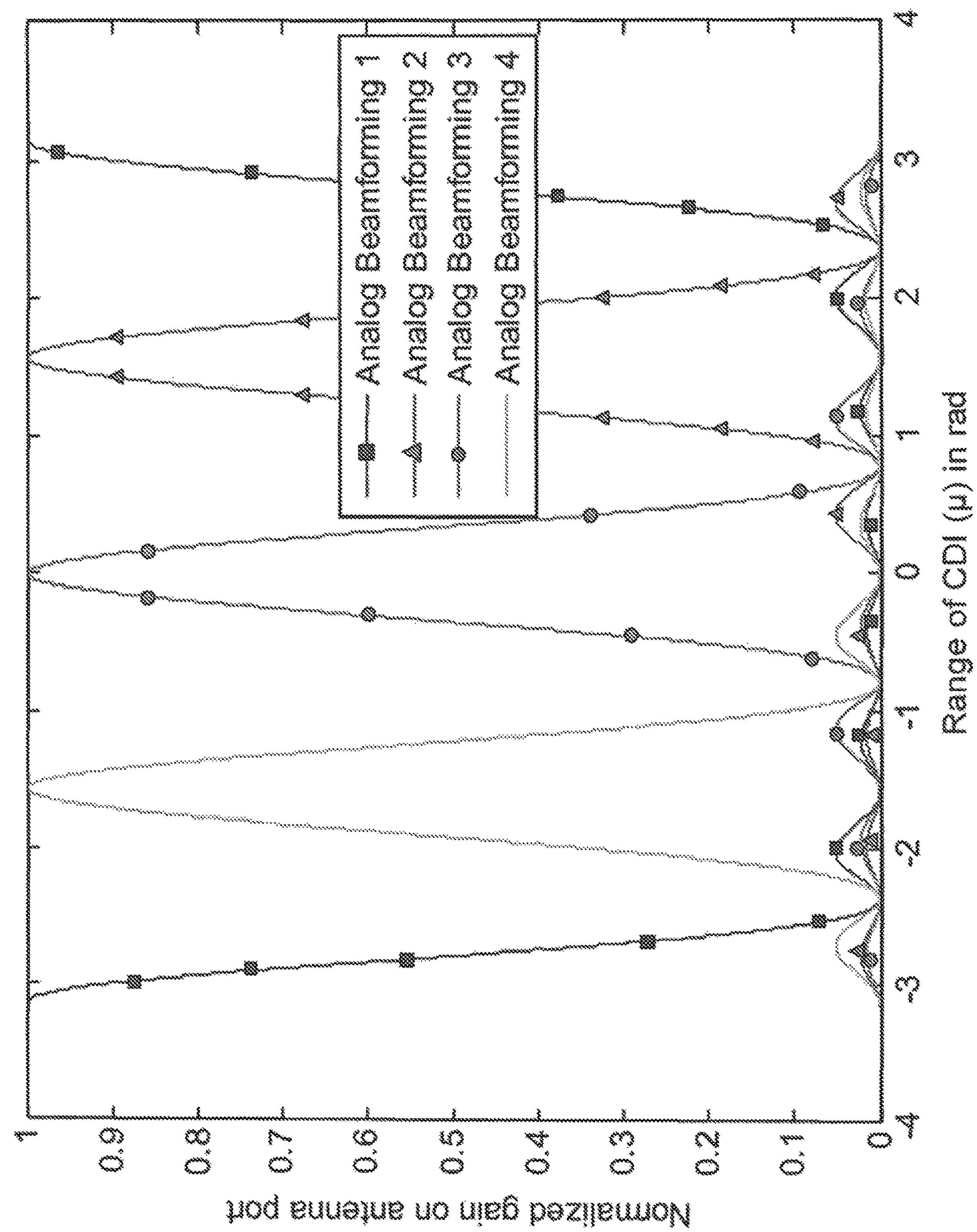
FIG. 4 shows a graphical model for hybrid beamforming in an aspect of this disclosure.

FIG. 4 shows a graphical model 400 for hybrid beamforming in an aspect of this disclosure. A numerical example by assuming M (the number of antenna elements)=8, N (the number of antenna ports)=4 and μ falling in the range [−π, π] is shown in graph 400. It should be appreciated that this illustration is exemplary in nature and other values for M, N, and the range may be assumed.

The base station, e.g. eNB, initializes the analog beamforming directions on the four antenna ports by setting $[\theta_1, \theta_2, \theta_3, \theta_4]=[-\pi, \pi/2, 0, -\pi/2]$. The specific design of the analog beamforming directions will be discussed more in detail in FIG. 7. For purposes of FIG. 4, it is important to note that the entire range of possibilities for μ is covered and that there is overlap between each of the adjacent antenna port beamforming areas.

The overall analog beamforming pattern consisting of the four beamforming directions (i.e. Analog Beamforming Directions 1-4) and respective beamforming areas (consisting of the main beam and the side lobes) are shown in 400, where the x-axis is the possible range of the CDI, or μ, and the y-axis is the normalized maximum beamforming gain. By using the initial directions and beamforming weights $w_n$, each antenna port's main beam is overlapped at least with a first sidelobe from each adjacent antenna port.

In graphical model 400, the main beams of each of the analog beamforming directions are depicted by the high peaks in the gains and the sidelobes are depicted by the smaller peaks.

After the beamforming pattern has been initialized, the UE may send a signal, e.g. a sounding reference signal (SRS) to the base station, e.g. eNB. The base station then measures the strength of the digital signal gain on each antenna port (in this example, antenna ports 1-4) at the output of the analog beamforming.

After measuring the digital signal gain $G_n$ at each of the four antenna ports, the base station performs the fast CDI acquisition for the UE. To illustrate the CDI acquisition, consider that antenna port 3 (i.e. antenna port producing Analog Beamforming 3) reports the highest signal gain of the signal sent by the UE. This indicates that the CDI μ must fall within the range of [−π/4, π/4], i.e. the range covered by the main lobe (highest peak) of Analog Beamforming 3. Next, the two adjacent antenna ports' (antenna port 2 and 4) signal gains are compared to determine which one reports a higher signal gain. In this example, consider that antenna port 2 reports a higher signal gain than antenna port 4. In this manner, we have determined that the range, or concerned direction interval, that the UE is located in (i.e. the CDI, μ) is in [0, π/4]. The strength of digital signals on antenna port 3 and 2 are $G_3$ and $G_2$, respectively. The process by which this interval is determined is discussed more in detail in FIG. 8.

In order to acquire the CDI for the UE, the base station, e.g. eNB, calculates a difference-sum ratio given by the highest signal gain (in this example, $G_3$) and the adjacent signal gain with the higher value (in this example, $G_2$). The ratio in this example may be demonstrated as follows:

$$r = \frac{G_3 - G_2}{G_3 + G_2}$$

Once the ratio is determined, a graph plotting the function r with respect to the value of μ can be used in order to determine the CDI μ.

Figure 5:
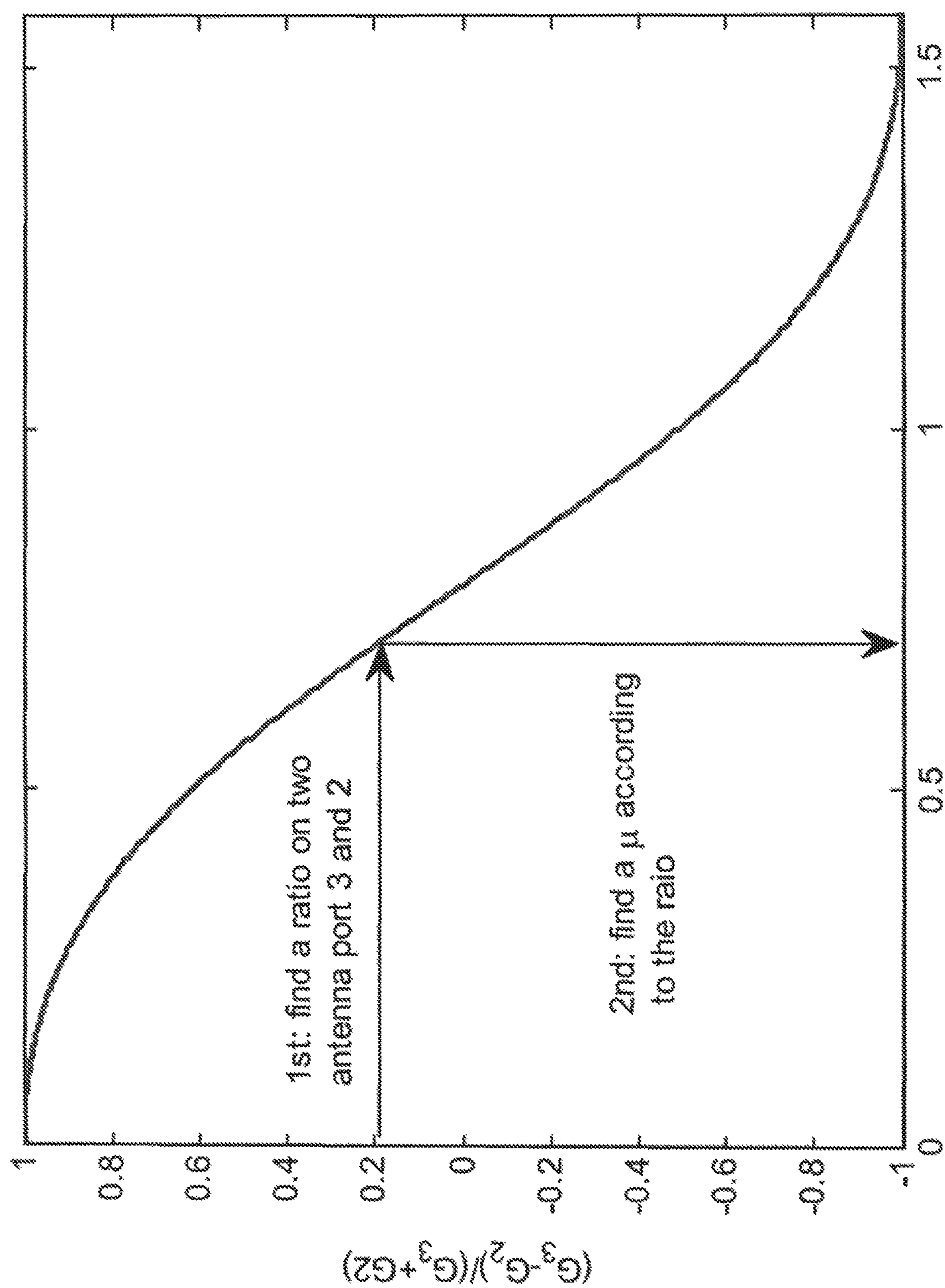
FIG. 5 shows an exemplary graph for a ratio of difference to sum for two antenna ports in an aspect of this disclosure.

In FIG. 5, a graph 500 plotting the ratio of two signal gains (in this example, $G_3$ and $G_2$) as a function of the CDI μ is shown. It should be appreciated that graph 500 is exemplary in nature and may thus be simplified for purposes of this explanation.

Graph 500 is generated once the parameters of the overall beamforming pattern are set, i.e. the parameters described for FIG. 4. The function of the ratio r with respect to the value of μ shows a monotonic decreasing property, and, importantly, the unknown value of the channel gain g and signal s is removed from the value of the ratio r. This important fact guarantees that the monotonic function, denoted as $r=f(\mu)$, is uniquely determined by the two adjacent analog beamforming patterns initialized by the base station only, and irrespective of any value of g and s. Because the function is monotonic, only one value of μ can correspond to each value of r, so by determining the value of r, we may determine the value of μ according to r.

Using this property, the CDI μ can be found via the inverse function $\mu=f^1(r)$, or more generally, the one-to-one-map between μ and r since it has been determined that μ is in the range [0, π/4]. This means that the base station employs ratio r, together with the inverse function $\mu=f^1(r)$, to acquire the continuously valued CDI μ for the UE. Then, the best analog beamforming on the antenna ports at the base station can be updated according to the acquired CDI μ for achieving the best beamforming gain. This update may consist of steering a beamforming direction by adjusting the beamforming weight (i.e. adjusting the phase shifters) in order to maximize the signal gain at an antenna port. The updated beamforming pattern may still satisfy the overlapping and monotonicity aspects of the initial beamforming pattern. Once the beamforming pattern is updated, the base station may calculate new functions for the updated concerned direction intervals. In this manner, as the CDI changes, i.e. the UE moves, the beamforming pattern may continuously be updated.

Graph 500 may be used for the range of [0, π/2], i.e. the entire range for which antenna ports 2 and 3 report the highest and higher signal gains, irrespective of order. In this example, since $G_3$ was higher than $G_2$, the range of [0, π/4] would be considered, but if, for example, antenna port 2 reported the highest signal gain and antenna port 3 reported the higher signal gain of antenna port 2's adjacent antenna ports, then the range of [π/4, π/2] of graph 500 would be considered in order to calculate the CDI μ. Similarly to graph 500 describing the relationship of signal gains between adjacent antenna ports 2 and 3 and their concerned direction interval, a similar graph describing the relationship in the signal gains for all of the adjacent antenna ports (i.e. for antenna ports 1 and 2; antenna ports 3 and 4; and antenna ports 1 and 4) is generated once the parameters of the overall beamforming pattern are set.

Figure 6:
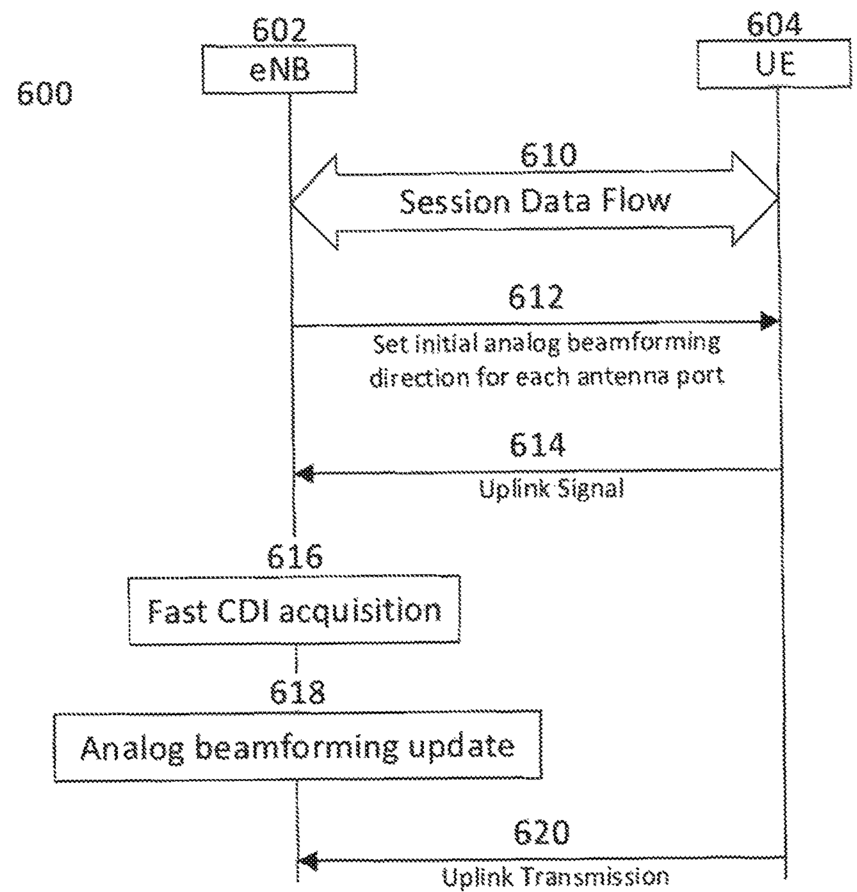
FIG. 6 shows an exemplary message sequence chart in an aspect of this disclosure.

FIG. 6 shows a message sequence chart 600 showing the exchange between base station, e.g. eNB, 602 and a UE 604 in an aspect of this disclosure. It is appreciated that chart 600 is exemplary in nature and thus may be simplified for purposes of this explanation.

Once there is a session data flow 610, the base station sets the initial analog beamforming directions for each antenna port 612. Upon setting the initial beamforming directions, the base station is able to generate a relationship (such as the graph shown in FIG. 5) describing a monotonic function between the concerned direction interval (range) and a correlation of the gains of adjacent antenna ports, i.e. a difference-to-sum ratio. After the UE sends an uplink signal 614, e.g. a sounding reference signal, the base station performs the fast CDI acquisition 616. This acquisition consists of determining which of the antenna ports reports the highest signal gain and its adjacent port with the higher signal gain in order to determine a ratio as described in FIG. 4-5. Once the ratio is determined, the value of the CDI μ may be determined using $\mu = f^1(r)$. After the CDI μ has been acquired, the base station can perform an analog beamforming update 618, i.e. adjust the beamforming weights, in order to achieve the best gain to receive uplink transmission 620 at a particular antenna port.

Alternatively, a similar process may be performed in order to achieve the best gain to send a downlink transmission from the base station to the UE.

Figure 7:
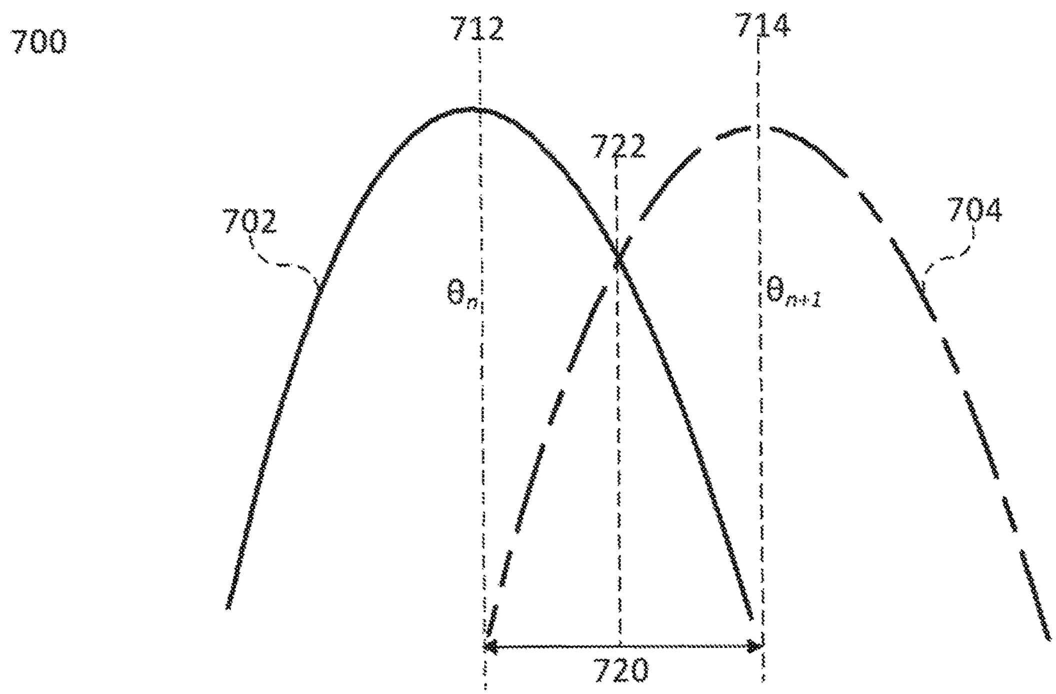
FIG. 7 shows an exemplary design of a portion of a beamforming pattern in an aspect of this disclosure.

FIG. 7 shows a portion of a design 700 of the overall beamforming pattern. It is appreciated that design 700 is exemplary in nature and may thus be simplified for purposes of this explanation. Design 700 takes into account main beams (main lobes) of the beamforming areas of two adjacent antenna ports, n and n+1.

The two adjacent antenna ports n and n+1 will have beamforming directions $\theta_n$ and $\theta_{n+1}$, respectively. The adjacent beamforming directions $\theta_n$ and $\theta_{n+1}$ will cover beamforming areas 702 and 704, respectively, which are part of the overall beamforming pattern from base station, e.g. eNB. As seen in FIG. 7, the two adjacent beamforming areas of $\theta_n$ and $\theta_{n+1}$ are monotonic on their right and left side as demonstrated on either side of dashed lines 712 and 714.

Additionally, the beamforming area 702 corresponding to $\theta_n$ and the beamforming area 704 corresponding to $\theta_{n+1}$ overlap on the interval 720. Interval 720 is the concerned direction interval for the two antenna ports for $\theta_n$ and $\theta_{n+1}$. The concerned direction interval 720 covers the possible range in which the CDI μ may be found between the two antenna ports. In an aspect of this disclosure, each pair of adjacent antenna ports has a concerned direction interval associated with the pair in which the pair of antenna ports will report back the highest and the higher signal gains if the other communication device (e.g. UE) is positioned within that particular concerned direction interval.

A more schematic design of this initial beamforming pattern should satisfy two requirements: monotonicity and overlap.

By monotonicity, it means that two adjacent beamforming directions, such as $\theta_n$ and $\theta_{n+1}$ shown in FIG. 7, can be mapped to a monotonic function that is invertible to the CDI μ, e.g. the difference-sum ratio shown in FIG. 5.

By overlap, it means that two adjacent beamforming areas, such as those shown for $\theta_n$ and $\theta_{n+1}$ in FIG. 7, overlap to form a concerned direction interval 720. For a concerned direction interval $[\theta_n, \theta_{n+1}]$, the strength of digital signal gain signals $G_n$ and $G_{n+1}$ on two adjacent antenna ports cannot be zero in the design except for a few singular points. For the concerned direction interval 720, the left side of line 722 represents the portion of the concerned direction interval for antenna ports n and n+1 for which antenna port n will have a higher signal gain than antenna port n+1 (i.e. $G_n > G_{n+1}$) and the right side of line 722 represents the portion of the concerned direction interval for antenna ports n and n+1 for which antenna port n+1 will have a higher signal gain than antenna port n (i.e. $G_{n+1} > G$).

While there may be more of an overlap in the beamforming areas of the two adjacent antenna ports, the overlap in the design of the beamforming pattern in this disclosure is done such that the beamforming area of an antenna port n+1 will overlap with a monotonic side of a beamforming area of an adjacent antenna port n in a manner that antenna port n+1 will account for the second highest signal gain (after antenna port n) over the aforementioned monotonic portion of antenna port n. In other words, the beamforming area for antenna port n+1 may protrude into more of the corresponding beamforming area for antenna port n, i.e. may cross to the left of dashed line 712, but in that interval, the beamforming area of antenna port n−1 (not pictured) will account for a higher signal gain, and thereby, be the signal gain that is used to calculate the difference-to-sum ratio. In other words, to the left of dashed line 712, the concerned direction interval will comprise of the beamforming areas of antenna port n−1 (with its beamforming direction $\theta_{n-1}$ and its associated beamforming area, not pictured) and antenna port n (with beamforming direction $\theta_n$ and the beamforming area 702 to the left of 712).

For the design of an initial beamforming pattern consisting of a plurality of beamforming areas with both main beams and sidelobes, we refer back to FIG. 4. In FIG. 4, an exemplary beamforming pattern shown by the normalized signal gains was provided when assuming M=8, N=4, and the range for CDI μ was [−π, π].

In FIG. 4, each beamforming area (which can be represented by the gains shown by Analog Beamforming 1-4) consists of a main beam (or main lobe, shown by the high normalized gain peaks) and six respective sidelobes (the little peaks). In this example, each main beam may have up to M−2 sidelobes, and since M=8, each main beam may have up to 6 sidelobes, which are all shown.

An important factor in the design of the beamforming pattern shown in FIG. 4 is that the main beam of each beamforming area (i.e. the four highest peaks corresponding with each of Analog Beamforming 1-4) is overlapped by the sidelobes of the other beamforming areas on one monotonic side of each of the main beams. For example, for antenna port 3, i.e. Analog Beamforming 3, the main beam covers the interval [−η/4, π/4]. On the left monotonic portion of the main beam of antenna port 3, i.e. the interval covering [−π/4, 0], the sidelobes of the beamforming areas of the other antenna ports are, in descending order of strength: 4, 2, and 1. On the right monotonic portion of the main beam of antenna port 3, i.e. the interval covering [0, π/4], the sidelobes of the beamforming areas of the other antenna ports are, in descending order of strength: 2, 4, and 1. As a result of this design, the base station can calculate a monotonic function depicting the relationship of the signal gains of adjacent antenna ports. For the interval covering [−π/4, 0], a monotonic function for the difference-to-sum ratio for the signal gain on antenna ports 3 and 4 across the interval is used. For the interval covering [0, π/4], a monotonic function for the difference-to-sum ratio for the signal gain on antenna ports 3 and 2 across the interval is used.

Put in other words, when looking at Analog Beamforming 3 (i.e. the line denoted with circles), the two most prominent sidelobes which cover the same range as the main beam of Analog Beamforming 3 are Analog Beamforming 4 (i.e. the plain line) and Analog Beamforming 2 (i.e. the line denoted with triangles). Each of these sidelobes overlap with Analog Beamforming 3 on one half of Analog Beamforming 3: a sidelobe of Analog Beamforming 4 most prominently overlaps with main beam of Analog Beamforming 3 on the left side of Analog Beamforming 3 and a sidelobe of Analog Beamforming 2 most prominently overlaps with the main beam of Analog Beamforming 3 on the right side of Analog Beamforming 3. In this manner, both the overlap and monotonicity requirements of the beamforming pattern in an embodiment of this disclosure are satisfied.

Figure 7A:
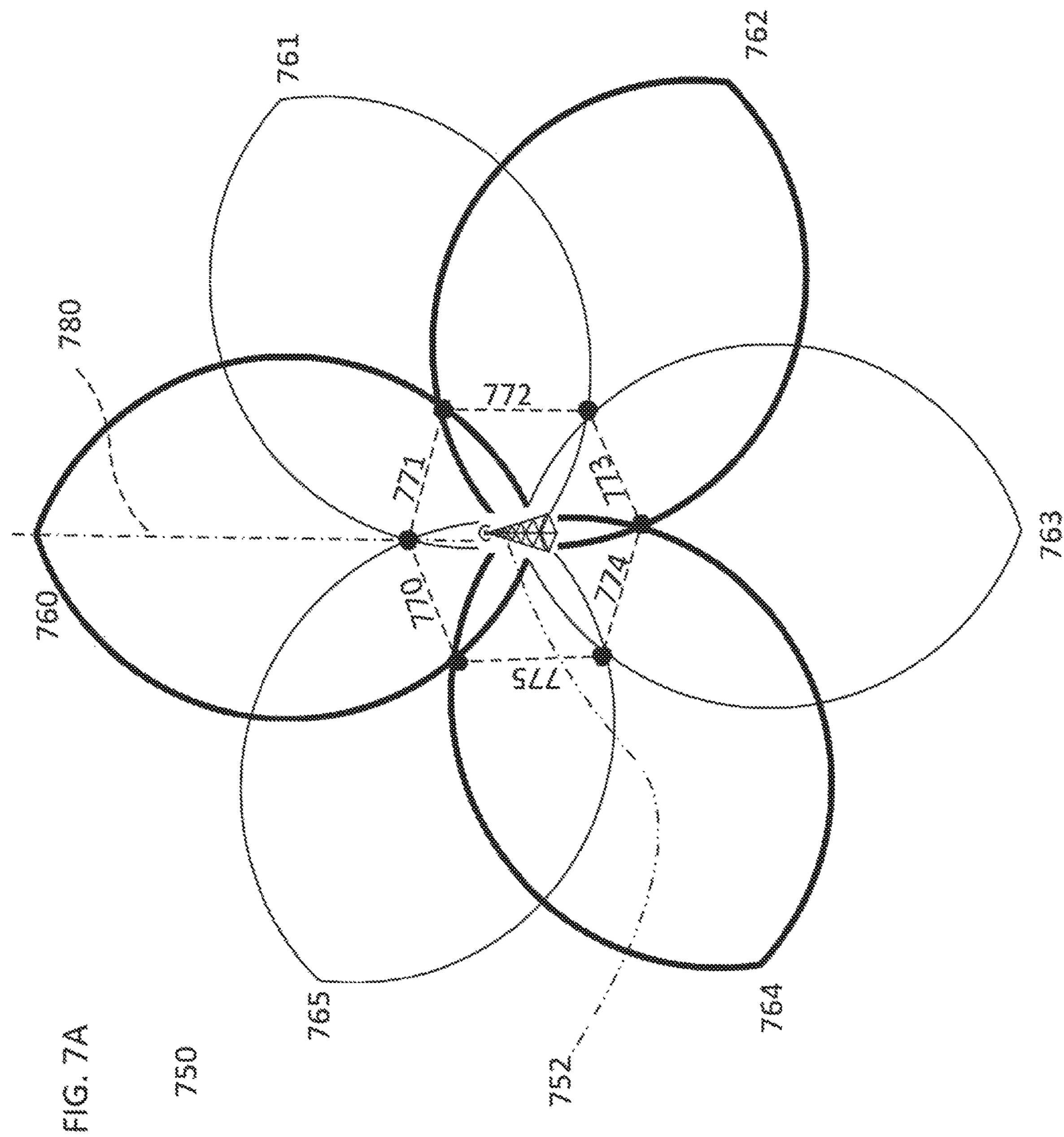
FIG. 7A shows an exemplary design of a beamforming pattern in an aspect of this disclose.

FIG. 7A shows a beamforming pattern 750 in an aspect of this disclosure. It is appreciated that beamforming pattern 750 is exemplary in nature and may thus be simplified for purposes of this explanation. For example, there may be a different number of main beams and/or there may be overlap between main beams and sidelobes.

In this example, the base station, e.g. eNB, 752 has six antenna ports, each of which produce a beamforming direction with corresponding beamforming areas 760-765. For purposes of this explanation, each antenna port will be connected to an array of two antenna elements (not shown) so that no sidelobes are formed. However, it is appreciated that this configuration may be altered so that beamforming pattern 750 may also consist of sidelobes (as shown by the graphical plot in FIG. 4).

Adjacent beamforming areas overlap to produce concerned direction intervals 770-775. In this manner, the overlapping beamforming areas from adjacent antenna ports produce concerned direction intervals which cover the entire range around the base station 752.

For beamforming area 760, the left side overlaps most prominently with beamforming area 765 to form concerned direction interval 770 while the right side of beamforming area 760 overlaps most prominently with beamforming area 761 to form concerned direction interval 771. Each half (i.e. monotonic portion) of beamforming area 760 is shown on either side of line 780.

Upon receiving the signal from the UE, e.g. SRS, the base station can proceed with the fast CDI acquisition process.

Figure 8:
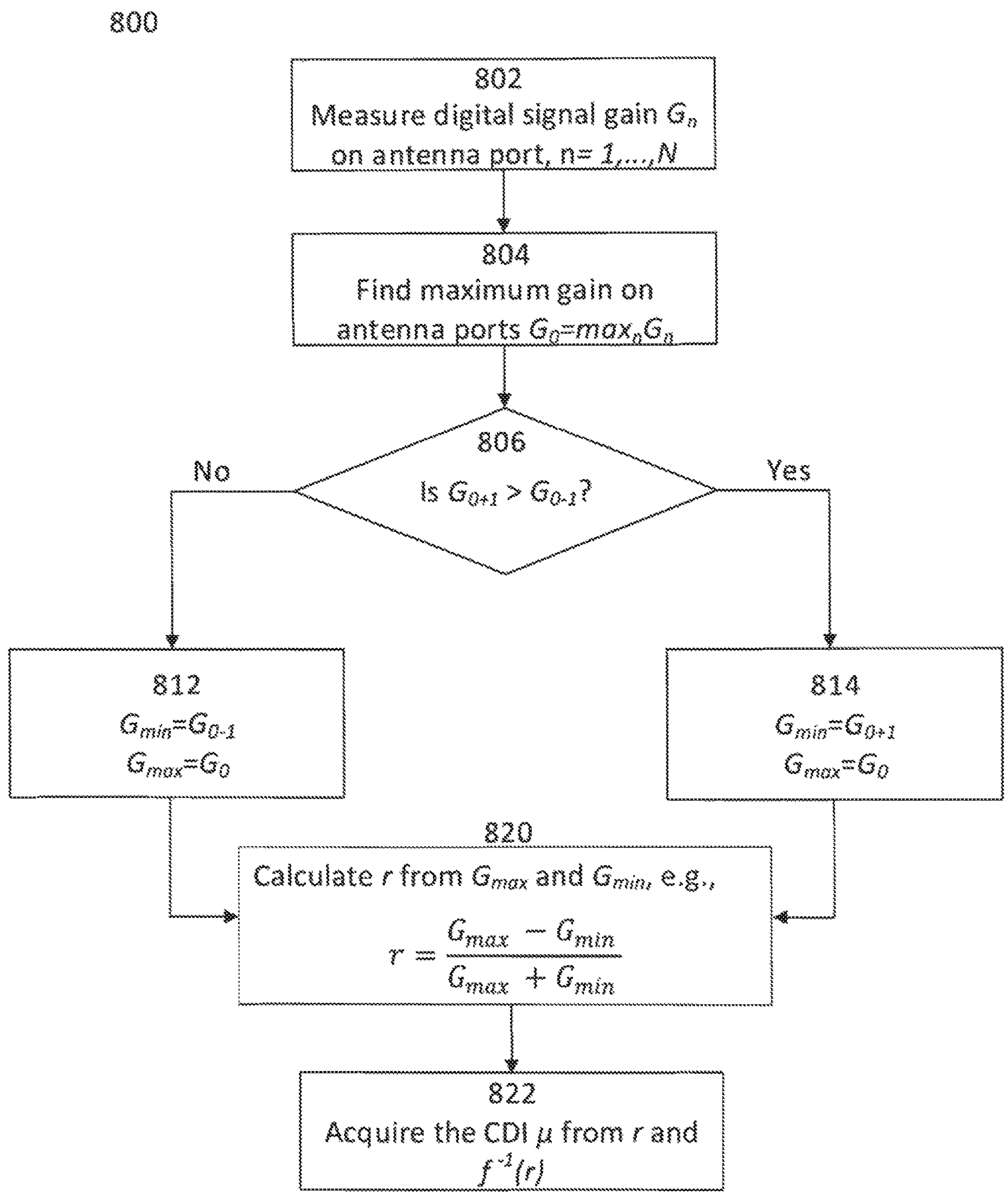
FIG. 8 shows a flowchart of CDI acquisition in an aspect of this disclosure.

FIG. 8 shows a flowchart 800 depicting the fast CDI acquisition process in an aspect of this disclosure. It is appreciated that flowchart 800 is exemplary in nature and may thus be simplified for purposes of this explanation.

After the UE sends an uplink signal to the base station, e.g. eNB, the base station commences the fast CSI acquisition process by measuring the digital signal gain $G_n$ on each of its antenna ports 802. Once the digital signal gain has been measured on the antenna ports, the antenna port with the maximum signal gain $G_0 = \max_n G_n$ is determined 804.

Once the antenna port with the maximum signal gain is determined, the two adjacent antenna ports' signal gains are compared to determine which signal gain is higher 806 in order to define the concerned channel direction interval for the CDI μ. If the antenna port with the highest signal gain is defined as $G_0$, and its corresponding beamforming direction is defined as $\theta_0$, then the CDI μ may fall in the range of $[\theta_0, \theta_{0+1}]$ or $[\theta_0, \theta_{0-1}]$.

If the antenna port with signal gain $G_{0+1}$ (i.e. the antenna port corresponding with beamforming direction $\theta_{0+1}$) is higher than that of $G_{0-1}$ (i.e. the antenna port corresponding with beamforming direction $\theta_{0-1}$), $G_{0+1}$ is used in the ratio calculation, i.e. the sum-difference ratio function 814. If signal gain $G_{0+1}$ is lower than $G_{0-1}$, $G_{0-1}$ is used in the ratio calculation 812. By comparing $G_{0+1}$ with $G_{0-1}$, the concerned direction interval of the adjacent antenna ports with the highest signal strength is chosen in order to determine which signal gains to use in the proceeding steps.

Once the adjacent port with the higher signal gain is determined, this higher determined signal gain is used in conjunction with the maximum (or highest) signal gain found in 804 in order to calculate r 820.

Together with the ratio r and a function calculated when the initial beamforming pattern was set (e.g. a graphical model as shown in FIG. 5), the base station acquires continuously-valued and accurate CDI μ for the UE. The inverse function of ratio r with the CDI μ can be implemented by a graph, chart, or table or also be calculated online.

Once the CDI μ has been acquired, the base station may update the best analog beamforming direction based on the acquire CDI μ and use the updated beamforming for better communication between the UE and the base station. The updated beamforming pattern may still satisfy the overlapping and monotonicity aspects of the initial beamforming pattern. Once the beamforming pattern is updated, the base station may calculate new functions for the updated concerned direction intervals. In this manner, as the CDI changes, i.e. the UE moves, the beamforming pattern may continuously be updated.

An aspect of this disclosure can be generalized for massive MIMO systems with 3D beamforming. In this case, the CDI of the UE contains two kinds of information, the horizontal CDI and the vertical CDI, and the process outlined in this disclosure can be applied either separately or jointly to acquire each CDI. Moreover, the subarray of antenna elements can be any type: uniform linear array, non-uniform linear array, uniform circular array, etc.

In another example of the CDI acquisition process in an aspect of this disclosure, the flowchart 800 of FIG. 8 will be applied to the beamforming pattern shown in graphical model 400 of FIG. 4.

After measuring the signal gains on each of a plurality of antenna ports, the base station, e.g. eNB, determines the antenna port with the maximum, or highest, gain 804 by determining which of the four main beams (i.e. the high peaks corresponding to each of the Analog Beamforming directions) the highest signal gain falls on.

Next, the adjacent antenna port with the higher signal gain is determined 806 by determining which of the smaller peaks (i.e. sidelobes) overlapping with the main beam has the higher signal gain. For example, if the maximum gain of the antenna port corresponding to Analog Beamforming 3 (i.e. line denoted with the circles) is the highest, determining the higher signal gain of the two adjacent antenna ports, i.e. either the antenna port responsible for Analog beamforming 2 or the antenna port responsible for Analog beamforming 4, will determine which half of Analog Beamforming 3 the gain falls on.

Next, the highest signal gain, in this example, the signal gain from beamforming 3, and the higher of the two adjacent beamforming signal gains, selected from 2 or 4, is used to calculate the ratio (r) and also used to determine which of the functions determined at the setting of the initial beamforming pattern to use in order to acquire the CDI.

Alternatively, the antenna port with adjacent beamforming directions to the antenna port with the highest signal gain may be compared in order to determine the higher signal gain of the two compared antenna ports. In this manner, the beamforming direction will dictate what antenna ports are compared and not the physical location of the antenna ports at the base station.

FIG. 9 shows a flowchart 900 in an aspect of this disclosure. It is appreciated that flowchart 900 is exemplary in nature and thus may be simplified for purposes of this explanation.

First, the base station, e.g. eNB, sets the initial overall beamforming pattern 902 from its plurality of antenna ports. This initial overall beamforming pattern is implemented taking into account the number of antenna ports, antenna elements and the possible range where the UE can be located (e.g. a range of 0 to 2π, or −π to π, would account for the entire range around the base station from an angular perspective). The overall beamforming pattern produced from the plurality of antenna ports of the UE also takes into account the overlapping and monotonic considerations previously described. Additionally, after setting the initial beamforming pattern, the base station calculates graphs (or charts, tables, etc.) showing a monotonic relationship for the signal gains (e.g. difference-to-sum ratio) and the concerned direction interval of adjacent antenna ports.

After receiving a signal from the UE 904, e.g. an SRS, the base station measures the signal gain on its plurality of antenna ports 906. The base station then determines which of the antenna ports has the highest signal gain and which of the antenna ports adjacent to the antenna port with this highest signal gain has the higher signal gain 908. In this manner, the base station is able to determine the concerned direction interval and use the appropriate graph (or chart, table, etc.) in determining the information (e.g. the CDI) from the other apparatus 910.

Figure 10:
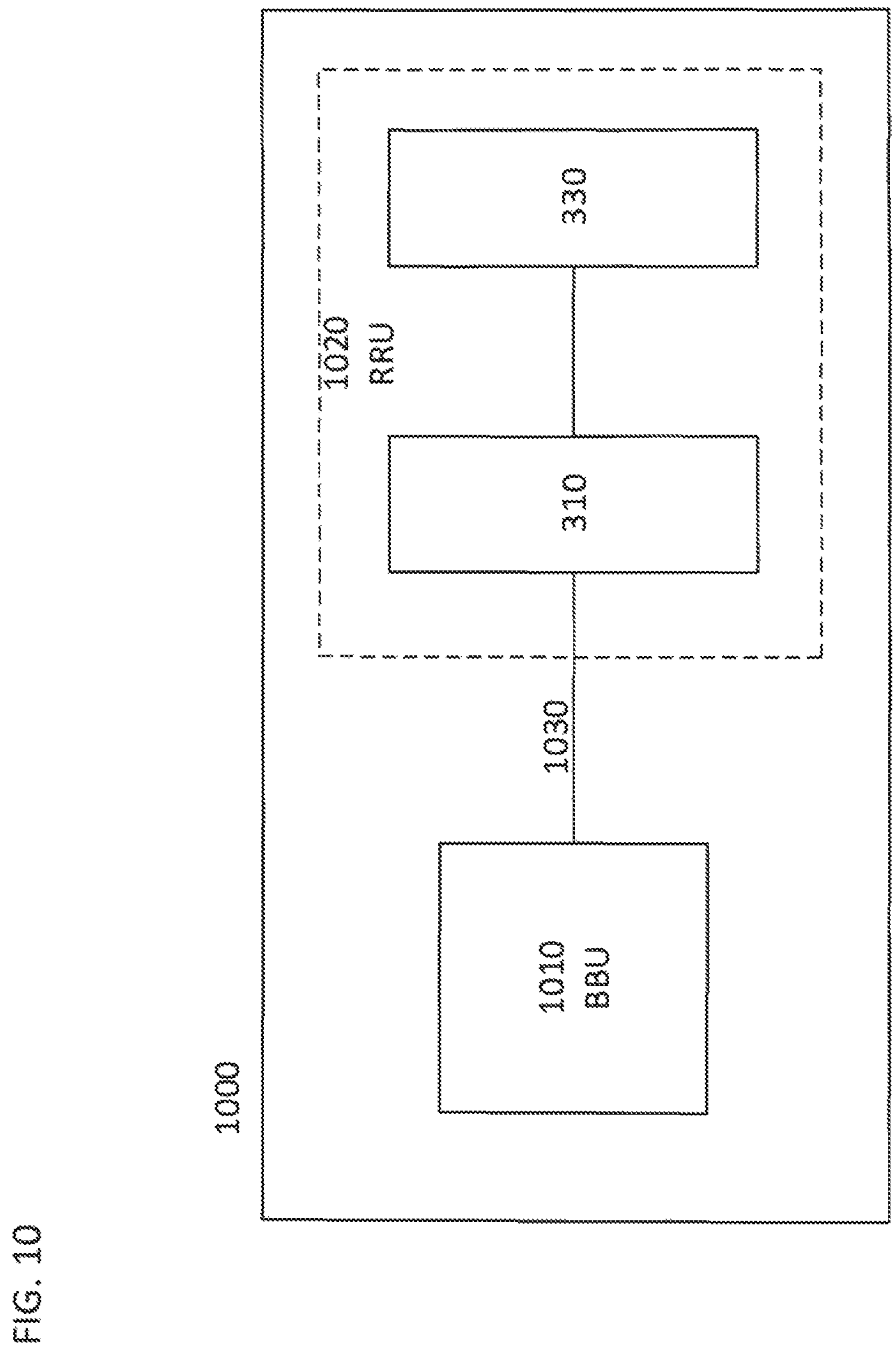
FIG. 10 shows a diagram of a communication device in an aspect of this disclosure.

FIG. 10 shows a diagram illustrating an exemplary internal configuration of a base station 1000 in an aspect of this disclosure. It is appreciated that base station 1000 is simplified for purposes of this explanation.

Base station 1000 (e.g. an eNB) may include baseband unit (BBU) 1010 and remote radio unit (RRU) 1020 components. It is appreciated that base station may include multiple BBUs 1010 and/or RRUs 1020 and may include these components in different configurations, e.g. BBU-RRU integrated components. It is also appreciated that base station 1000 may include other components, e.g., at least one memory component, at least one power component, at least one analog combiner, etc.

The RRU 1020 may comprise an array of antenna ports 310 and an array of antenna elements 330 as described in FIG. 3. RRU may further comprise an analog combiner; an automatic gain control, analog to digital converter, and fast Fourier transform hardware; RB selection hardware; and channel estimation and compression hardware.

A BBU 1010 may serve multiple RRUs 1020 and may perform the baseband processing of mobile communication signals. BBUs may further provide or receive digital mobile communication signals to or from at least one RRU. The RRUs may be responsible for radio frequency processing of mobile communication signals and may include digital (e.g. the antenna ports 310) as well as analog circuitry (e.g. the antenna elements 330) in order to receive and perform initial processing on wireless radio frequency signals. The BBU 1010 may exchange digital mobile communication data with one or more RRUs 1020 over an optical fiber or similar high-speed connection, such as using a Common Public Radio Interface (CPRI) standard over an optical fiber data link.

It is understood that the components of base station 1000, such as the BBU 1010, RRU 1020, and all internal components thereof (e.g. the BBU hardware, RRW hardware, memory components, compression components, etc.) may be structurally implemented as hardware, software executed on hardware or a mixture thereof. Specifically, BBU 1010 and RRU 1020 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 1000 components may be detailed herein substantially in terms of functional operation in recognition that a person of skill in the art may readily appreciate the various possible structural realizations of each component that will provide the desired functionality.

RRU 1020 may exchange data with BBU 1010 over RRU-BBU interconnection link 1030, which may be e.g. an optical fiber. While the description may focus on the uplink path, it is understood that base station 1000 may additionally be capable of operating on the downlink path.

Base station 1000 may receive wireless uplink signals using antenna array 330. An analog combiner in RRU 1020 may then combine the resulting uplink data signals, such as by combining the uplink data signals from sets of two or more antennas of antenna array 330 in the analog domain. Analog combiner may thus yield analog data streams which indicate the number of analog data streams produced by analog combiner, which may be equal to or less than the actual number of physical receive antennas in antenna array 330.

RRU 1020 may process the analog data streams received from analog combiner using processing circuitry. RRU 1020 may perform automatic gain control (AGC) and analog-todigital conversion (ADC) on the analog data streams received from analog combiner and subsequently perform Fast Fourier Transform (FFT) processing in order to generate frequency domain symbols.

RRU 1020 may therefore further include channel estimation (CE) and compression hardware, which may be composed of digital processing circuitry. RRU 1020 may thus require extra calculation and processing hardware, which may be utilized in order to perform channel estimation and calculate compression filters.

RRU 1020 may then transmit resulting data to BBU 1010 over RRU-BBU interconnection link 1030. BBU 1010 may receive the data and perform equalization and coordinated processing. BBU 1010 may be composed of processing circuitry.

The baseband unit (i.e. baseband modem or baseband processor) may be configured to set an initial beamforming pattern to be produced by the antenna port and array configuration, wherein the initial beamforming pattern consists of a beamforming direction and its corresponding beamforming area from each of the plurality of antenna ports, wherein the beamforming areas of adjacent antenna ports overlap each other to form a concerned direction interval for each pair of adjacent antenna ports (e.g. if N antenna ports, a concerned direction interval for: antenna ports 1 and 2, antenna ports 2 and 3, antenna ports 3 and 4, . . . , antenna ports N−1 and N, and antenna ports N and 1). The baseband unit can be further configured to process received signals from each of the antenna ports (via the antenna arrays) and measure the signal gains of each of the plurality of antenna ports. The baseband unit can be further configured to determine which antenna port has the highest signal gain, and then determine which of the antenna ports adjacent to the antenna port with the highest signal gain has the higher signal gain. In this manner, the baseband unit can determine the specific concerned direction interval that the other communication device (e.g. the UE) occupies. The baseband unit may be further configured to process the information from the other apparatus received via the RRU. This information may include the CDI $\mu$ or any other information from the other communication device.

The baseband unit may be further configured to, upon setting the initial beamforming pattern, determining a function for each adjacent pair of antenna ports (e.g. if N antenna ports, a concerned direction interval for: antenna ports 1 and 2, antenna ports 2 and 3, antenna ports 3 and 4, . . . , antenna ports N−1 and N, and antenna ports N and 1) for a relationship of the signal gains of each of the antenna ports and a position within the concerned direction interval of the pair of adjacent antenna ports. This graph can be a difference-to-sum ratio of the signal gains as shown by graph 500 in FIG. 5.

The baseband unit may be further configured to compute a difference-to-sum ratio of the antenna ports with the highest signal gains, i.e. the antenna port with the highest signal gain and its adjacent antenna port with the higher signal gain. The baseband unit may be further configured to use the calculated difference-to-sum ratio and the appropriate graphical relationship (or can be tabular, etc.) to determine the precise CDI $\mu$ of the other communication device (e.g. the UE).

After determining the CDI $\mu$, the baseband unit may be further configured to update the beamforming pattern to be produced by the antenna port/antenna element configurations by adjusting the beamforming weights of at least one of the phase shifters connected to the antenna arrays. After updating the beamforming pattern produced by the antenna port/antenna element configurations, the baseband unit may be configured to receive further information from the other communication device via the antenna port/antenna element configurations and process it. The baseband unit may also be further configured to transmit information to the other communication device after updating the beamforming pattern.

Figure 11:
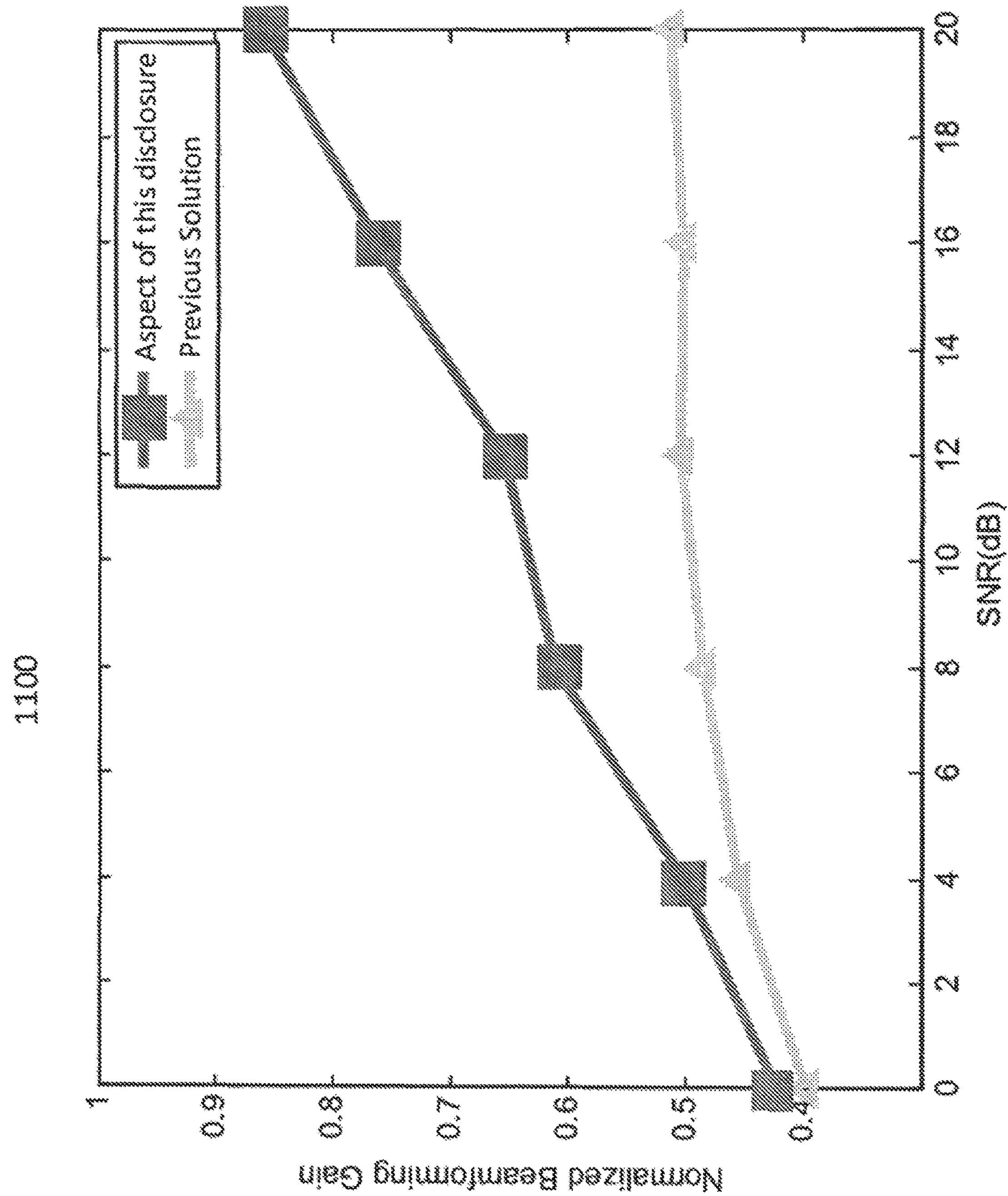
FIG. 11 shows a graph demonstrating the improved performance of an aspect of this disclosure.

FIG. 11 shows graph 1100 showing a performance comparison between the previous method of CDI acquisition and the method of CDI acquisition in an aspect of this disclosure.

In the previous solution, the analog beamforming directions are restricted to a finite set. The base station tries each beamforming direction in the set, and selects the best direction as the acquired CDI from the UE. Therefore, the analog beamforming directions are only limited to the pre-given set. As discussed before, the main drawback to this approach is that the acquired CDI is finite, discrete, and this inaccurate to the true CDI. This degrades the performance of analog beamforming in a massive MIMO system. In comparison, the aspect of this disclosure considers an infinite number of beamforming directions due to the continuous updating and also exploits the well-designed beamforming directions and patterns to acquire true and accurate CDI.

The performance of the aspect of this disclosure is shown by the line marked with the squares and the performance of the previous solution is shown by the line marked with triangles, where the final analog beamforming gain, $G_n=\|w_n^H h(\mu)s\|^2$ is averaged over uniformly distributed $\mu$ in $[0, 2\pi]$ under different signal to noise ratios (SNRs). As shown in FIG. 11, the method and apparatus described in this disclosure show a larger analog beamforming gain than the previous implementations in spite of channel SNRs (receiver noise is considered).

In Example 1, a method for a communication device with a plurality of antenna ports to determine an information from a second device comprising setting an initial beamforming pattern, wherein the initial beamforming pattern comprises a beamforming direction and a corresponding beamforming area for each of the plurality of antenna ports, comprising determining a concerned direction interval based on overlapping beamforming areas of adjacent pairs of the plurality of antenna ports; receiving a signal from the second device; measuring a signal gain from the signal on each of the plurality of antenna ports; determine which concerned direction interval the second device occupies based on an antenna port having the highest signal gain and on one of the adjacent pair of antenna ports to the antenna port having the highest signal gain having a higher signal gain; and determining the information from the second device based on the determined concerned direction interval.

In Example 2, the subject matter of Example 1 may further include wherein the information is a channel direction information (CDI).

In Example 3, the subject matter of any one of Examples 1-2 may further include wherein the concerned direction interval for each pair of adjacent antenna ports comprises a first beamforming area of a first antenna port of the pair overlapping on a portion of a second beamforming area of a second antenna port of the pair.

In Example 4, the subject matter of any one of Examples 1-3 may further include wherein the concerned direction interval for each pair of adjacent antenna ports comprises an area in which the first antenna port of a pair of antenna ports and the second antenna port of a pair of antenna ports account for the highest signal gain and the higher signal gain within the concerned direction interval.

In Example 5, the subject matter of any one of Examples 1-4 may further include coupling each antenna port to an array of analog antenna elements.

In Example 6, the subject matter of Example 5 may further include coupling each antenna element to a phase shifter.

In Example 7, the subject matter of Example 6 may further include controlling each phase shifter with an analog beamforming weight.

In Example 8, the subject matter of any one of Examples 1-7 may further include wherein each beamforming area comprises a main lobe.

In Example 9, the subject matter of any of Examples 1-8 may further include wherein each beamforming area further comprises at least one sidelobe.

In Example 10, the subject matter of any one of Examples 1-9 can further include wherein overlapping of adjacent beamforming areas comprises one of the adjacent beamforming areas overlapping on at least one half of the main lobe of its adjacent beamforming area.

In Example 11, the subject matter of any one of Examples 1-10 may further include wherein the signal is a reference signal.

In Example 12, the subject matter of any one of Examples 1-11 may further include wherein the signal gain on each of plurality of antenna ports is a digital signal gain.

In Example 13, the subject matter of any one of Examples 1-12 may further include upon setting the initial beamforming pattern, determining a function for a relationship of signal gains for each pair of adjacent antenna ports and a position within the concerned direction interval for each pair of adjacent antenna ports.

In Example 14, the subject matter Example 13, wherein the function is monotonic.

In Example 15, the subject matter of any one of Examples 13-14 may further include wherein the relationship of signal gains for each pair of adjacent antenna ports comprises a difference-to-sum ratio of the signal gains of the adjacent antenna ports.

In Example 16, the subject matter of any one of Examples 13-15 may further include computing a difference-to-sum ratio of the highest signal gain and the higher signal gain of the pair of adjacent antenna ports; and using the difference-to-sum ratio and the function to determine the information.

In Example 17, the subject matter of Examples 1-16 may further include updating the beamforming pattern based on the acquired information in order to maximize the signal gain on at least one of the plurality of antenna ports.

In Example 18, the subject matter of any one of Examples 1-17 may further include updating the beamforming pattern by adjusting a beamforming weight of at least one phase shifter.

In Example 19, the subject matter of any one of Examples 16-18 may further include using the updated beamforming pattern to receive at least one transmission from the second device.

In Example 20, the subject matter of any one of Examples 16-19 may further include using the updated beamforming pattern to send at least one transmission to second device.

In Example 21, the subject matter of any one of Examples 16-20 may further include further comprising continuously updating the beamforming pattern in order to maximize the signal gain on an antenna port.

In Examples 22, a method for a communication device with a plurality of antenna ports to update a beamforming pattern, comprising: setting an initial beamforming direction for each of the plurality of antenna ports, wherein each beamforming direction has a beamforming coverage area, wherein beamforming coverage areas of antenna ports with adjacent beamforming directions overlap each other to form a concerned direction interval; receiving a signal from a second device and measuring a signal gain from the signal on each of the plurality of antenna ports; determining an antenna port having the highest signal gain; comparing signal gains of the two antenna ports with beamforming directions adjacent to the antenna port having the highest signal gain and selecting the higher signal gain of the two compared antenna ports; using the highest signal gain and the higher signal gain of the pair of compared signal gains to determine a location of the second device; and updating the beamforming pattern.

In Example 23, the subject matter of Example 22 may further include wherein each antenna port is coupled to an array of antenna elements.

In Example 24, the subject matter of Example 23 may further include wherein each antenna element is coupled to a phase shifter.

In Example 25, the subject matter of Example 24 may further include controlling each phase shifter with an analog beamforming weight in order to update the beamforming pattern.

In Example 26, the subject matter of any one of Examples 22-25 may further include upon setting the initial beamforming pattern, determining a function for a relationship of signal gains for each pair of antenna ports with adjacent beamforming directions and a position within a concerned direction interval for each pair of antenna ports with adjacent beamforming directions.

In Example 27, the subject matter of Example 26 may further include wherein the function is monotonic due to design in the overlap of the beamforming areas in the concerned direction interval.

In Example 28, the subject matter of any one of Examples 26-27 may further include computing a difference-to-sum ratio of the highest signal gain and the higher signal gain of the two compared antenna ports; and using the difference-to-sum ratio and the function to determine the location of the other second device.

In Example 29, the subject matter of any one of Examples 22-28 may further include using the updated beamforming pattern to receive at least one transmission from the second device.

In Example 30, the subject matter of any one of Examples 22-28 may further include using the updated beamforming pattern to send at least one transmission to the second device.

In Example 31, a communication device configured to determine an information from a second device comprising a radio frequency unit comprising a plurality of antenna ports configured to receive a signal from a second device; a baseband unit configured to set an initial beamforming pattern, wherein the initial beamforming pattern comprises a beamforming direction and a corresponding beamforming area from each of the plurality of antenna ports, comprising determining a concerned direction interval based on overlapping beamforming areas of adjacent pairs of the plurality of antenna ports; measure a signal gain from the signal on each of the plurality of antenna ports; determine which concerned direction interval the second device occupies based on an antenna port having a highest signal gain and on one of the adjacent pair of antenna ports to the antenna port having the highest signal gain having a higher signal gain; and determine the information from the second device based on the determined concerned direction interval.

In Example 32, the subject matter of Example 31 may further include wherein the information is a channel direction information (CDI).

In Example 33, the subject matter of Example 31-32 may further include wherein the concerned direction interval for each pair of adjacent antenna ports comprises a first beamforming area of a first antenna port of the pair overlapping on a portion of a second beamforming area of a second antenna port of the pair.

In Example 34, the subject matter of Example 33 may further include wherein the concerned direction interval for each pair of adjacent antenna ports comprises an area in which the first antenna port of a pair of antenna ports and the second antenna port of a pair of antenna ports account for the highest signal gain and the higher signal gain within the concerned direction interval.

In Example 35, the subject matter of any of Examples 31-34 may further include wherein each antenna port is coupled to an array of analog antenna elements.

In Example 36, the subject matter of Example 35 may further include wherein each antenna element is coupled to a phase shifter.

In Example 37, the subject matter of Example 36 may further include the baseband unit further configured to control each phase shifter with an analog beamforming weight.

In Example 38, the subject matter of any of Examples 31-37 may further include wherein each beamforming area comprises a main lobe.

In Example 39, the subject matter of any of Examples 31-38 may further include wherein each beamforming area further comprises at least one sidelobe.

In Example 40, the subject matter of any of Examples 31-39 may further include wherein overlapping of adjacent beamforming areas comprises one of the adjacent beamforming areas overlapping on at least one half of the main lobe of its adjacent beamforming area.

In Example 41, the subject matter of any of Examples 31-40 may further include wherein the signal is a reference signal.

In Example 42, the subject matter of any of Examples 31-41 may further include wherein the signal gain on each of plurality of antenna ports is a digital signal gain.

In Example 43, the subject matter of any of Examples 31-42 may further include the baseband unit further configured to upon setting the initial beamforming pattern, determine a function for a relationship of signal gains for each pair of adjacent antenna ports and a position within the concerned direction interval for each pair of adjacent antenna ports.

In Example 44, the subject matter of Example 43 may further include wherein the function is monotonic.

In Example 45, the subject matter of any of Examples 43-44 may further include wherein the relationship of signal gains for each pair of adjacent antenna ports comprises a difference-to-sum ratio of the signal gains of the adjacent antenna ports.

In Example 46, the subject matter of any of Examples 43-45 may further include, the baseband unit further configured to compute a difference-to-sum ratio of the highest signal gain and the higher signal gain of the pair of adjacent antenna ports; and use the difference-to-sum ratio and the function to determine the information.

In Example 47, the subject matter of Example 46 may further include the baseband unit further configured to update the beamforming pattern based on the acquired information in order to maximize the signal gain on at least one of the plurality of antenna ports.

In Example 48, the subject matter of Example 47 may further include the baseband unit further configured to update the beamforming pattern by adjusting a beamforming weight of at least one phase shifter.

In Example 49, the subject matter of any of Examples 46-48 may further include the baseband unit further configured to use the updated beamforming pattern to receive transmissions from the second device via the radio frequency unit.

In Example 50, the subject matter of any of Examples 46-49 may further include the baseband unit further configured to use the updated beamforming pattern to send transmissions to the second device via the radio frequency unit.

In Example 51, the subject matter of any of Examples 46-50 may further include the baseband unit further configured to continuously update the beamforming pattern in order to maximize the signal gain on an antenna port.

In Example 52, a communication device configured to update a beamforming pattern, comprising a radio frequency unit comprising a plurality of antenna ports configured to receive a signal from a second device; and a baseband unit configured to set an initial beamforming direction from each of the plurality of antenna ports, wherein each beamforming direction has a beamforming coverage area, wherein beamforming coverage areas of antenna ports with adjacent beamforming directions overlap each other to form a concerned direction interval; measure a signal gain from the signal on each of the plurality of antenna ports; determine an antenna port having the highest signal gain; compare the signal gains of the two antenna ports with beamforming directions adjacent to the antenna port with the highest signal gain and selecting the higher signal gain of the two compared antenna ports; use the highest signal gain and the higher signal gain of the two compared antenna ports to determine a location of the second device; and update the beamforming pattern.

In Example 53, the subject matter of Example 52 may further include wherein each antenna port is coupled to an array of antenna elements.

In Example 54, the subject matter of Example 53 may further include wherein each array of antenna elements is coupled to a phase shifter.

In Example 55, the subject matter of Example 54 may further include the baseband unit being further configured to control each phase shifter with an analog beamforming weight in order to update the beamforming pattern.

In Example 56, the subject matter of any one of Examples 52-55 may further include the baseband unit being further configured to upon setting the initial beamforming pattern, determine a function for a relationship of signal gains for each pair of antenna ports with adjacent beamforming directions and a position within the concerned direction interval for the pair of antenna ports with adjacent beamforming directions.

In Example 57, the subject matter of Example 56 may further include wherein the function is monotonic due to design in the overlap of the beamforming areas in the concerned direction interval.

In Example 58, the subject matter of any one of Examples 56-57 may further include the baseband unit being further configured to compute a difference-to-sum ratio of the highest signal gain and the higher signal gain of the two compared antenna ports; and use the difference-to-sum ratio and the function to determine the location of the second device.

In Example 59, the subject matter of any one of Examples 52-58 may further include the communication device being further configured to use the updated beamforming pattern to receive at least one transmission from the second device.

In Example 60, the subject matter of any one of Examples 52-58 may further include the communication device being further configured to use the updated beamforming pattern to send at least one transmission to the second device.

In Example 61, a non-transitory computer readable medium with computer readable instructions to cause a processor to execute a determination of an information from a second device, comprising setting an initial beamforming pattern, wherein the initial beamforming pattern comprises a beamforming direction and a corresponding beamforming area for each of the plurality of antenna ports, comprising determining a concerned direction interval based on overlapping beamforming areas of adjacent pairs of the plurality of antenna ports; receiving a signal from the second device; measuring a signal gain from the signal on each of the plurality of antenna ports; determine which concerned direction interval the second device occupies based on an antenna port having the highest signal gain and on one of the adjacent pair of antenna ports to the antenna port having the highest signal gain having a higher signal gain; and determining the information from the second device based on the determined concerned direction interval.

In Example 62, the subject matter of Example 61 may further include wherein the information is a channel direction information (CDI).

In Example 63, the subject matter of any one of Examples 61-62 may further include wherein the concerned direction interval for each pair of adjacent antenna ports comprises a first beamforming area of a first antenna port of the pair overlapping on a portion of a second beamforming area of a second antenna port of the pair.

In Example 64, the subject matter of any one of Examples 61-63 may further include wherein the concerned direction interval for each pair of adjacent antenna ports comprises an area in which the first antenna port of the pair of antenna ports and the second antenna port of the pair of antenna ports account for the highest signal gain and the higher signal gain of the concerned direction interval.

In Example 65, the subject matter of any one of Examples 61-64 may further include coupling each antenna port to an array of analog antenna elements.

In Example 66, the subject matter of Example 65 may further include coupling each antenna element to a phase shifter.

In Example 67, the subject matter of Example 66 may further include controlling each phase shifter with an analog beamforming weight.

In Example 68, the subject matter of any one of Examples 61-67 may further include wherein each beamforming area comprises a main lobe.

In Example 69, the subject matter of any of Examples 61-68 may further include wherein each beamforming area further comprises at least one sidelobe.

In Example 70, the subject matter of any one of Examples 61-69 can further include wherein overlapping of adjacent beamforming areas comprises one of the adjacent beamforming areas overlapping on at least one half of the main lobe of its adjacent beamforming area.

In Example 71, the subject matter of any one of Examples 61-70 may further include wherein the signal is a reference signal.

In Example 72, the subject matter of any one of Examples 61-71 may further include wherein the signal gain on each of plurality of antenna ports is a digital signal gain.

In Example 73, the subject matter of any one of Examples 61-72 may further include upon setting the initial beamforming pattern, determining a function for a relationship of signal gains for each pair of adjacent antenna ports and a position within the concerned direction interval for each pair of adjacent antenna ports.

In Example 74, the subject matter Example 73, wherein the function is monotonic.

In Example 75, the subject matter of any one of Examples 73-74 may further include wherein the relationship of signal gains for each pair of adjacent antenna ports comprises a difference-to-sum ratio of the signal gains of the adjacent antenna ports.

In Example 76, the subject matter of any one of Examples 73-75 may further include computing a difference-to-sum ratio of the highest signal gain and the higher signal gain of the two adjacent antenna ports; and using the difference-to-sum ratio and the function to determine the information.

In Example 77, the subject matter of Examples 61-76 may further include updating the beamforming pattern based on the acquired information in order to maximize the signal gain on at least one of the plurality of antenna ports.

In Example 78, the subject matter of any one of Examples 61-77 may further include updating the beamforming pattern by adjusting a beamforming weight of at least one phase shifter.

In Example 79, the subject matter of any one of Examples 76-78 may further include using the updated beamforming pattern to receive at least one transmission from the second device.

In Example 80, the subject matter of any one of Examples 76-79 may further include using the updated beamforming pattern to send at least one transmission to the second device.

In Example 81, the subject matter of any one of Examples 76-80 may further include further comprising continuously updating the beamforming pattern in order to maximize the signal gain on an antenna port.

In Examples 82, a method for a communication device with a plurality of antenna ports to update a beamforming pattern, comprising: setting an initial beamforming direction from each of the plurality of antenna ports, wherein each beamforming direction has a beamforming coverage area, wherein beamforming coverage areas of antenna ports with adjacent beamforming directions overlap each other to form a concerned direction interval; receiving a signal from a second device and measuring a signal gain from the signal on each of the plurality of antenna ports; determining which antenna port has the highest signal gain; comparing the signal gains of the two antenna ports with beamforming directions adjacent to the antenna port with the highest signal gain and selecting a higher signal gain of the two compared antenna ports; using the highest signal gain and the higher signal gain of the two compared antenna ports to determine a location of the other apparatus; and updating the beamforming pattern.

In Example 83, the subject matter of Example 82 may further include wherein each antenna port is coupled to an array of antenna elements.

In Example 84, the subject matter of Example 83 may further include wherein each array of antenna elements is coupled to a phase shifter.

In Example 85, the subject matter of Example 84 may further include controlling each phase shifter with an analog beamforming weight in order to update the beamforming pattern.

In Example 86, the subject matter of any one of Examples 82-85 may further include upon setting the initial beamforming pattern, determining a function for a relationship of signal gains for each pair of antenna ports with adjacent beamforming directions and a position within the concerned direction interval for the pair of antenna ports with adjacent beamforming directions.

In Example 87, the subject matter of Example 86 may further include wherein the function is monotonic due to design in the overlap of the beamforming areas in the concerned direction interval.

In Example 88, the subject matter of any one of Examples 86-87 may further include computing a difference-to-sum ratio of the highest signal gain and the higher signal gain of the two compared antenna ports; and using the difference-to-sum ratio and the function to determine the location of the other apparatus.

In Example 89, the subject matter of any one of Examples 82-88 may further include using the updated beamforming pattern to receive at least one transmission from the other apparatus.

In Example 90, the subject matter of any one of Examples 82-88 may further include using the updated beamforming pattern to send at least one transmission to the other apparatus.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device configured to determine an information from a second device comprising:

a radio frequency antenna comprising a plurality of antenna ports configured to receive a signal from the second device;

a baseband modem configured to set an initial beamforming pattern, wherein the initial beamforming pattern comprises a beamforming direction and a corresponding beamforming area from each of the plurality of antenna ports, comprising determining a concerned direction interval based on overlapping beamforming areas of adjacent pairs of the plurality of antenna ports, and upon setting the initial beamforming pattern, determine a function for a relationship of signal gains for each pair of adjacent antenna ports and a position within the concerned direction interval for each pair of adjacent antenna ports, wherein the function is monotonic;

measure a signal gain from the signal on each of the plurality of antenna ports;

determine which concerned direction interval the second device occupies based on an antenna port having a highest signal gain and on one of the adjacent pair of antenna ports to the antenna port having the highest signal gain having a higher signal gain; and determine the information from the second device based on the determined concerned direction interval.

2. The communication device of claim 1, wherein the information is a channel direction information (CDI).

3. The communication device of claim 1, wherein the concerned direction interval for each pair of adjacent antenna ports comprises a first beamforming area of a first antenna port of the pair overlapping on a portion of a second beamforming area of a second antenna port of the pair.

4. The communication device of claim 3, further comprising wherein the concerned direction interval for each pair of adjacent antenna ports comprises an area in which the first antenna port of a pair of antenna ports and the second antenna port of a pair of antenna ports account for the highest signal gain and the higher signal gain within the concerned direction interval.

5. The communication device of claim 1, wherein each beamforming area comprises a main lobe.

6. The communication device of claim 5, wherein overlapping of adjacent beamforming areas comprises one of the adjacent beamforming areas overlapping on at least one half of the main lobe of its adjacent beamforming area.

7. The communication device of claim 1, wherein the relationship of signal gains for each pair of adjacent antenna ports comprises a difference-to-sum ratio of the signal gains of the adjacent antenna ports.

8. The communication device of claim 7, the baseband modem further configured to:

compute a difference-to-sum ratio of the highest signal gain and the higher signal gain of the pair of adjacent antenna ports; and use the difference-to-sum ratio and the function to determine the information.

9. The communication device of claim 8, the baseband modem further configured to update the beamforming pattern based on the acquired information in order to maximize the signal gain on at least one of the plurality of antenna ports.

10. A communication device configured to update a beamforming pattern, comprising:

a radio frequency antenna comprising a plurality of antenna ports configured to receive a signal from a second device; and a baseband modem configured to:

set an initial beamforming direction from each of the plurality of antenna ports, wherein each beamforming direction has a beamforming coverage area, wherein beamforming coverage areas of antenna ports with adjacent beamforming directions overlap each other to form a concerned direction interval, and upon setting the initial beamforming pattern, determine a function for a relationship of signal gains for each pair of antenna ports with adjacent beamforming directions and a position within the concerned direction interval for each pair of antenna ports with adjacent beamforming directions, wherein the function is monotonic;

measure a signal gain from the signal on each of the plurality of antenna ports;

determine an antenna port having the highest signal gain;

compare the signal gains of the two antenna ports with beamforming directions adjacent to the antenna port with the highest signal gain and selecting the higher signal gain of the two compared antenna ports;

use the highest signal gain and the higher signal gain of the two compared antenna ports to determine a location of the second device; and update the beamforming pattern.

11. The communication device of claim 10, the baseband modem being further configured to:

compute a difference-to-sum ratio of the highest signal gain and the higher signal gain of the two compared antenna ports; and use the difference-to-sum ratio and the function to determine the location of the other apparatus.

12. A method for a communication device with a plurality of antenna ports to determine an information from a second device comprising:

setting an initial beamforming pattern, wherein the initial beamforming pattern comprises a beamforming direction and a corresponding beamforming area for each of the plurality of antenna ports, comprising determining a concerned direction interval based on overlapping beamforming areas of adjacent pairs of the plurality of antenna ports;

determining a function for a relationship of signal gains for each pair of adjacent antenna ports and a position within the concerned direction interval for each pair of adjacent antenna ports, wherein the function is monotonic;

receiving a signal from the second device;

measuring a signal gain from the signal on each of the plurality of antenna ports;

determining which concerned direction interval the second device occupies based on an antenna port having the highest signal gain and on one of the adjacent pair of antenna ports to the antenna port having the highest signal gain having a higher signal gain; and determining the information from the second device based on the determined concerned direction interval.

13. The method of claim 12, further comprising wherein the concerned direction interval for each pair of adjacent antenna ports comprises a first beamforming area of a first antenna port of the pair overlapping on a portion of a second beamforming area of a second antenna port of the pair.

14. The method of claim 13, further comprising wherein the concerned direction interval for each pair of adjacent antenna ports comprises an area in which the first antenna port of a pair of antenna ports and the second antenna port of a pair of antenna ports account for the highest signal gain and the higher signal gain within the concerned direction interval.

15. The method of claim 12, wherein the relationship of signal gains for each pair of adjacent antenna ports comprises a difference-to-sum ratio of the signal gains of the adjacent antenna ports.

16. The method of claim 12, further comprising:

computing a difference-to-sum ratio of the highest signal gain and the higher signal gain of the pair of adjacent antenna ports; and using the difference-to-sum ratio and the function to determine the information.

17. The method of claim 16, further comprising updating the beamforming pattern based on the acquired information in order to maximize the signal gain on at least one of the plurality of antenna ports.

18. A method for a communication device with a plurality of antenna ports to update a beamforming pattern, comprising:

setting an initial beamforming direction for each of the plurality of antenna ports, wherein each beamforming direction has a beamforming coverage area, wherein beamforming coverage areas of antenna ports with adjacent beamforming directions overlap each other to form a concerned direction interval;

determining a function for a relationship of signal gains for each pair of adjacent antenna ports having adjacent beamforming directions and a position within the concerned direction interval for each pair of antenna ports having adjacent beamforming directions, wherein the function is monotonic;

receiving a signal from a second device and measuring a signal gain from the signal on each of the plurality of antenna ports;

determining an antenna port having the highest signal gain;

comparing signal gains of the two antenna ports with beamforming directions adjacent to the antenna port having the highest signal gain and selecting the higher signal gain of the two compared antenna ports;

using the highest signal gain and the higher signal gain of the pair of compared signal gains to determine a location of the second device; and updating the beamforming pattern.

* * * * *